United States Patent
Rimini et al.

(10) Patent No.: US 11,579,244 B2
(45) Date of Patent: Feb. 14, 2023

(54) MULTIPLEXING RADAR BEAT SIGNALS

(71) Applicant: Qualcomm Incorporated, San Diego, CA (US)

(72) Inventors: Roberto Rimini, San Diego, CA (US); Eyosias Yoseph Imana, Chula Vista, CA (US)

(73) Assignee: QUALCOMM Incorporated, San Diego, CA (US)

(*) Notice: Subject to any disclaimer, the term of this patent is extended or adjusted under 35 U.S.C. 154(b) by 559 days.

(21) Appl. No.: 16/696,550

(22) Filed: Nov. 26, 2019

(65) Prior Publication Data

US 2021/0156954 A1   May 27, 2021

(51) Int. Cl.
| | |
|---|---|
| *G01S 7/03* | (2006.01) |
| *H04J 1/05* | (2006.01) |
| *H04J 13/12* | (2011.01) |
| *H04Q 11/04* | (2006.01) |

(52) U.S. Cl.
CPC ............. *G01S 7/03* (2013.01); *H04J 1/05* (2013.01); *H04J 13/12* (2013.01); *H04Q 11/04* (2013.01); *H04Q 2213/13294* (2013.01)

(58) Field of Classification Search
CPC .... G01S 7/03; H04J 1/05; H04J 13/12; H04Q 11/04; H04Q 2213/13294
USPC .................................................. 370/175, 189
See application file for complete search history.

(56) References Cited

U.S. PATENT DOCUMENTS

| | | |
|---|---|---|
| 9,977,115 B2 | 5/2018 | Park et al. |
| 10,061,015 B2 | 8/2018 | Breen et al. |
| 2012/0119940 A1 | 5/2012 | Mizutani et al. |
| 2016/0084939 A1 | 3/2016 | Hasegawa et al. |
| 2016/0306034 A1 | 10/2016 | Trotta et al. |
| 2017/0153316 A1 | 6/2017 | Wintermantel |
| 2017/0230920 A1 | 8/2017 | Shwartz |
| 2018/0180713 A1* | 6/2018 | Cohen ................ G01S 13/32 |

(Continued)

FOREIGN PATENT DOCUMENTS

| | | |
|---|---|---|
| DE | 102009026927 A1 | 12/2010 |
| JP | 2011215114 A | 10/2011 |

OTHER PUBLICATIONS

International Search Report and Written Opinion—PCT/US2020/059123—ISA/EPO—dated Feb. 16, 2021.

(Continued)

*Primary Examiner* — Obaidul Huq
(74) *Attorney, Agent, or Firm* — Colby Nipper/Qualcomm

(57) ABSTRACT

An apparatus is disclosed for multiplexing radar beat signals. In an example aspect, the apparatus includes an antenna array and a wireless transceiver jointly configured to transmit a radar transmit signal and receive two or more radar receive signals. The two or more radar receive signals represent portions of the radar transmit signal that are reflected by an object. The wireless transceiver comprises a radio-frequency integrated circuit with two or more receive chains and a multiplexing circuit. Each one of the two or more receive chains is configured to generate a radar beat signal by downconverting a respective radar receive signal of the two or more radar receive signals using the radar transmit signal. The multiplexing circuit is coupled to the two or more receive chains and is configured to multiplex the two or more radar beat signals together to generate a composite radar beat signal.

33 Claims, 14 Drawing Sheets

(56) References Cited

U.S. PATENT DOCUMENTS

| | | |
|---|---|---|
| 2018/0252807 A1 | 9/2018 | Fox et al. |
| 2018/0267144 A1 | 9/2018 | Lin et al. |
| 2018/0287651 A1 | 10/2018 | Fernando et al. |
| 2018/0348353 A1 | 12/2018 | Lien et al. |
| 2020/0103495 A1* | 4/2020 | Iwasa .................... G01S 7/2813 |
| 2020/0185804 A1* | 6/2020 | Watanabe ............. G01S 13/584 |

OTHER PUBLICATIONS

Venkatakrishnan S B., "Simultaneous Transmit/Receive Multi-Functional Ultra-Wideband Transceiver with Reduced Hardware", Jul. 12, 2017 (Jul. 12, 2017), 197 Pages, XP055772188, http://rave.ohiolink.edu/etdc/view?acc_num=osu1499802814937457, Retrieved from the Internet: URL:https://etd.ohiolink.edu/apexprod/rws_etd/send_file/send?accession=0su1499802814937457&disposition=inline, [retrieved on Feb. 4, 2021] Figures 1.10, 1.11 p. 15, Lines 1-3 Section 1.2.3 (c) Section 1.2.3 (d).

* cited by examiner

MULTIPLEXING RADAR BEAT SIGNALS

TECHNICAL FIELD

This disclosure relates generally to wireless transceivers and, more specifically, to a wireless transceiver for radar signals.

BACKGROUND

To increase transmission rates and throughput, cellular and other wireless networks are using signals with higher frequencies and smaller wavelengths. As an example, fifth generation (5G)-capable devices communicate with networks using frequencies that include those at or near the extremely-high frequency (EHF) spectrum (e.g., frequencies greater than 24 gigahertz (GHz)) with wavelengths at or near millimeter wavelengths. These signals have various technological challenges, such as higher path loss as compared to signals for earlier generations of wireless communications. In certain scenarios it can be difficult for a 5G wireless signal to travel far enough to make cellular communications feasible at these higher frequencies.

Transmit power levels can be increased or transmit beamforming can concentrate energy in a particular direction to compensate for the higher path loss. These types of compensation techniques, however, increase power densities. The Federal Communications Commission (FCC) has determined a maximum permitted exposure (MPE) limit to accommodate these higher power densities. To meet targeted guidelines based on this MPE limit, devices balance performance with transmission power and other considerations. This balancing act can be challenging to realize given cost, size, functional design objectives, and/or involved constraints.

SUMMARY

An apparatus is disclosed that implements techniques of multiplexing radar beat signals that can be used for object detection, which can further include object identification and/or ranging. In example implementations, a wireless transceiver includes a radio-frequency integrated circuit, a processor, and interface circuitry. The interface circuitry couples the radio-frequency integrated circuit to the processor and includes at least one communication path, which may have a constrained bandwidth. The radio-frequency integrated circuit includes multiple receive chains that generate respective radar beat signals by downconverting multiple radar receive signals using a radar transmit signal. Through the use of the radar transmit signal, the downconverting operation implements a beating operation and bandwidths of the radar beat signals are narrower than bandwidths of the radar receive signals.

A multiplexing circuit, which may be disposed within the radio-frequency integrated circuit, generates at least one composite radar beat signal by multiplexing the radar beat signals together. The multiplexing circuit may use, for example, analog frequency-division multiplexing (FDM), digital frequency-division multiplexing, code-division multiplexing (CDM), digital time-division multiplexing (TDM), or digital bit packing. In some implementations, the multiplexing circuit performs sub-Nyquist sampling to reduce the sampling rate of an analog-to-digital converter due to the sparsity of the spectral content of the beat signals. The multiplexing circuit can also generate the composite radar beat signal such that a bandwidth of the composite radar beat signal is narrower than a bandwidth of the interface circuitry. With the composite radar beat signal, the interface circuitry can pass the multiple radar beat signals in parallel from the radio-frequency integrated circuit to the processor even with a resource-constrained communication path.

A demultiplexing circuit is implemented, for example by the processor, and demultiplexes the composite radar beat signal to extract the radar beat signals. For object detection or identification purposes, for instance, the processor implements a digital beamformer, which processes the radar beat signals to generate a spatial response. By analyzing the spatial response, the processor can determine an angle to an object that reflected the radar transmit signal. Based on the determined angle, the wireless transceiver can adjust a transmission parameter that is used to transmit a subsequent uplink signal. By adjusting the transmission parameter, the processor can control a power density of the uplink signal at the object and meet targeted guidelines.

In an example aspect, an apparatus is disclosed for multiplexing radar beat signals. The apparatus includes an antenna array and a wireless transceiver coupled to the antenna array. The antenna array and the wireless transceiver are jointly configured to transmit a radar transmit signal and receive two or more radar receive signals. The two or more radar receive signals represent portions of the radar transmit signal that are reflected by an object. The wireless transceiver comprises a radio-frequency integrated circuit with two or more receive chains and a multiplexing circuit. Each one of the two or more receive chains is configured to generate a radar beat signal by downconverting a respective radar receive signal of the two or more radar receive signals using the radar transmit signal. The multiplexing circuit is coupled to the two or more receive chains and is configured to multiplex the radar beat signals together to generate a composite radar beat signal.

In an example aspect, an apparatus is disclosed for multiplexing radar beat signals. The apparatus includes transmission means for transmitting a radar transmit signal and reception means for receiving two or more radar receive signals. The two or more radar receive signals represent portions of the radar transmit signal that are reflected by an object. The apparatus also includes downconversion means for generating two or more radar beat signals by downconverting the two or more radar receive signals using the radar transmit signal. The apparatus further includes multiplexing means for generating a composite radar beat signal by multiplexing the two or more radar beat signals together.

In an example aspect, a method for multiplexing radar beat signals to facilitate propagation across resource-constrained interface circuitry is disclosed. The method includes transmitting a radar transmit signal and receiving two or more radar receive signals. The two or more radar receive signals represent portions of the radar transmit signal that are reflected by an object. The method also includes downconverting the two or more radar receive signals using the radar transmit signal to generate two or more radar beat signals. The method further includes multiplexing the two or more radar beat signals together to generate a composite radar beat signal and propagating the composite radar beat signal across the resource-constrained interface circuitry.

In an example aspect, an apparatus is disclosed for multiplexing radar beat signals. The apparatus comprises a wireless transceiver with a radio-frequency integrated circuit, which comprises a transmit chain, two or more receive chains, and a multiplexing circuit. The radio-frequency integrated circuit is configured to connect to an antenna array. The transmit chain comprises an upconversion mixer.

The two or more receive chains each comprise a downconversion mixer having an input coupled to an output of the upconversion mixer. The multiplexing circuit is coupled to outputs of the two or more downconversion mixers.

BRIEF DESCRIPTION OF DRAWINGS

FIG. 2-1 illustrates an example operating environment for a computing device.

FIG. 2-2 illustrates another example operating environment for a computing device.

FIG. 5-1 illustrates an example radio-frequency integrated circuit for multiplexing radar beat signals.

FIG. 5-2 illustrates an example processor that supports multiplexing radar beat signals.

FIG. 7-1 illustrates an example analog frequency-division multiplexing circuit for multiplexing radar beat signals.

FIG. 7-2 illustrates an example digital frequency-division multiplexing circuit for multiplexing radar beat signals.

FIG. 9-1 illustrates an example digital time-division multiplexing circuit for multiplexing radar beat signals.

FIG. 9-2 illustrates an example digital packing circuit for multiplexing radar beat signals.

DETAILED DESCRIPTION

Figure 1:
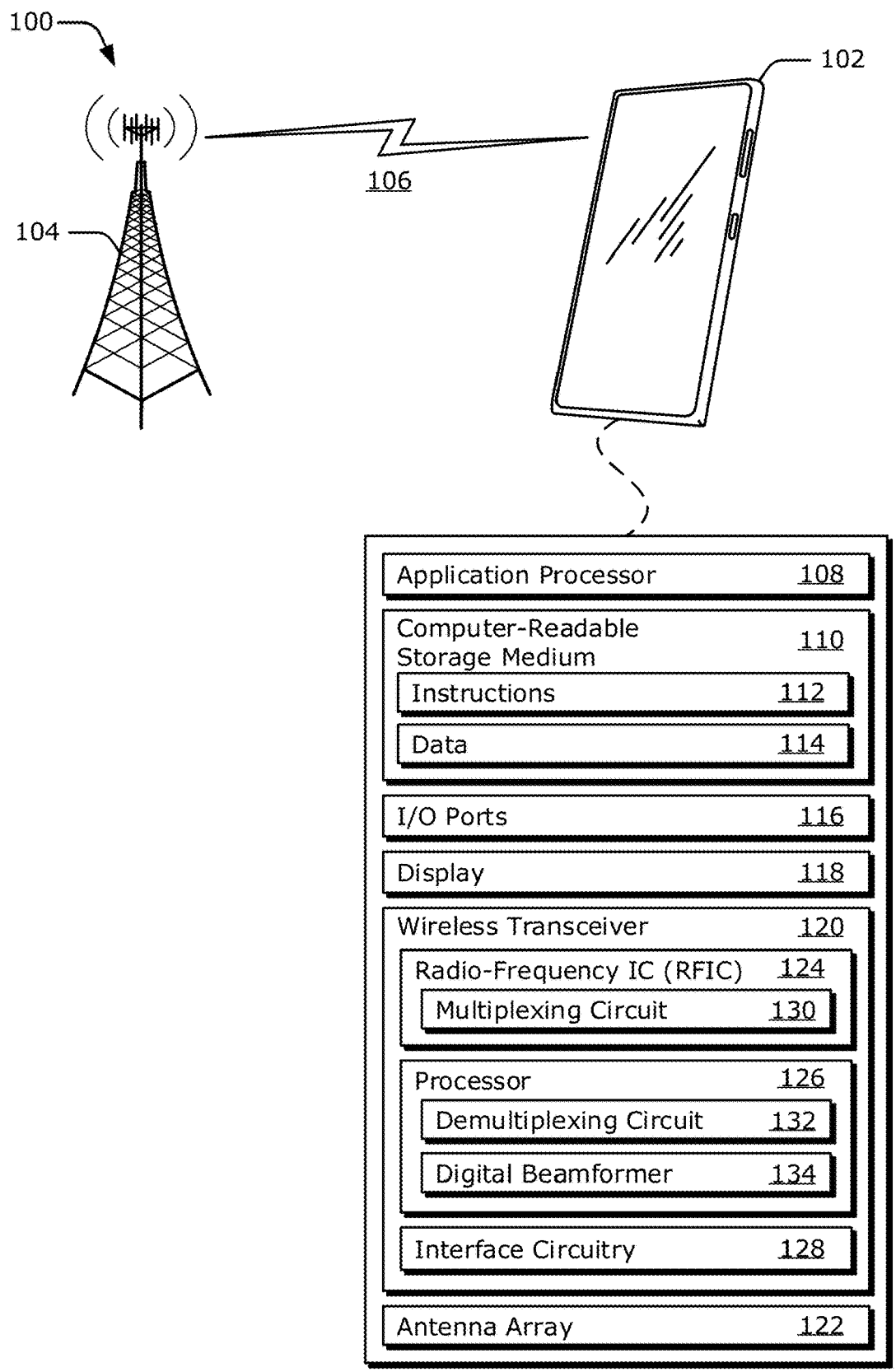
FIG. 1 illustrates an example computing device for multiplexing radar beat signals.

Implementations of high-frequency and small-wavelength communications may balance performance with a need to meet the Federal Communications Commission's maximum permitted exposure limit (e.g., the FCC's MPE limit). Devices which properly perform this balancing may take advantage of increased data rates, such as those enabled by 5G and Wi-Fi 6™ wireless communications. Because the MPE limit is affected by the proximity of a user to a device's antenna, techniques described in this document can be used to detect a user's proximity to a device to improve wireless performance while staying within the FCC's MPE limit. Based on the detected proximity, the device can balance a power density of transmitted wireless signals with the requirement to meet the MPE limit. As a result, the device is permitted to transmit wireless signals with higher average power levels, which enables the wireless signals to travel farther, such as between a smart phone and a remote cellular base station.

Some proximity-detection techniques use a dedicated sensor to detect the user, such as a camera or an infrared sensor. However, these sensors can be bulky or expensive. Furthermore, a single electronic device can include multiple antennas that are positioned on different surfaces (e.g., on a top side, on a bottom side, on a front side, or on opposite sides). To account for each of these antennas, multiple cameras or other sensors may need to be installed near each of these antennas, which further increases a cost and size of the electronic device.

Techniques described herein use a wireless transceiver to perform radar sensing in addition to wireless communication. Using radar sensing, a nearby object (e.g., an appendage of the user) can be detected, and transmission parameters of a following uplink signal for wireless communication can be adjusted to meet targeted guidelines, such as an MPE limit determined by the FCC. In particular, the wireless transceiver can use radar sensing to determine a distance (e.g., slant range) to the object and adjust a power density of the uplink signal based on the distance to the object.

It is also desirable to determine an angle to the object such that the following uplink signal can be steered away from the object to decrease the power density at the object. A design of the wireless transceiver, however, can make it challenging to determine this angle via radar sensing. If the wireless transceiver performs analog beamforming using analog phase shifters, for instance, these analog phase shifters may not have sufficient bit resolutions to achieve a target angular resolution for radar sensing.

In addition to or instead of using analog beamforming, digital beamforming can be used to determine the angle to the object. Generally, digital beamforming analyzes phase rotations across multiple receive antenna elements in a digital domain to determine an angle of arrival of a received signal. A design of the wireless transceiver, however, may make it challenging to pass information from multiple receive chains to a processor (e.g., a modem or a digital signal processor) for digital beamforming. For example, an interface between a radio-frequency integrated circuit and the processor can include one fewer communication paths (e.g., electrical connectors) for reception than there are antennas receiving the signal. Although using a limited quantity of communication paths, including one, for reception can reduce interference and noise within the wireless transceiver and decrease implementation area, it does not readily support parallel propagation of multiple receive signals associated with multiple receive chains. Furthermore, a bandwidth of the electrical connector(s) can be smaller than a bandwidth of a received radar signal. As such, it can be even more challenging to pass individual radar signals associated with different antenna elements of an antenna array during radar sensing for techniques such as digital beamforming or classification of a detected object.

To address this challenge, the techniques of multiplexing radar beat signals that can be used for object detection are described herein. Object detection can further include object identification and/or ranging. In example implementations, a wireless transceiver includes a radio-frequency integrated circuit, a processor, and interface circuitry. The interface circuitry couples the radio-frequency integrated circuit to the processor and includes at least one communication path, which may have a constrained bandwidth. The radio-frequency integrated circuit includes multiple receive chains that generate respective radar beat signals by downconverting multiple radar receive signals using a radar transmit signal. Through the use of the radar transmit signal, the downconverting operation implements a beating operation and bandwidths of the radar beat signals are narrower than bandwidths of the radar receive signals.

A multiplexing circuit, which may be disposed within the radio-frequency integrated circuit, generates at least one composite radar beat signal by multiplexing the radar beat signals together. The multiplexing circuit may use, for example, analog frequency-division multiplexing (FDM), digital frequency-division multiplexing, code-division multiplexing (CDM), digital time-division multiplexing (TDM), or digital bit packing. In some implementations, the multiplexing circuit performs sub-Nyquist sampling to reduce the sampling rate of an analog-to-digital converter due to the sparsity of the spectral content of the beat signals. The multiplexing circuit can also generate the composite radar beat signal such that a bandwidth of the composite radar beat signal is narrower than a bandwidth of the interface circuitry. With the composite radar beat signal, the interface circuitry can pass the multiple radar beat signals in parallel from the radio-frequency integrated circuit to the processor even with a resource-constrained communication path.

A demultiplexing circuit is implemented, for example by the processor, and demultiplexes the composite radar beat signal to extract the radar beat signals. For object detection purposes, the processor implements a digital beamformer, which processes the radar beat signals to generate a spatial response. By analyzing the spatial response, the processor can determine an angle to an object that reflected the radar transmit signal. Based on the determined angle, the wireless transceiver can adjust a transmission parameter that is used to transmit a subsequent uplink signal. By adjusting the transmission parameter, the processor can control a power density of the uplink signal at the object and meet targeted guidelines.

FIG. 1 illustrates an example computing device 102 for multiplexing radar beat signals. In an environment 100, the computing device 102 communicates with a base station 104 through a wireless communication link 106 (wireless link 106). In this example, the computing device 102 is depicted as a smart phone. However, the computing device 102 can be implemented as any suitable computing or electronic device, such as a modem, a cellular base station, a broadband router, an access point, a cellular phone, a gaming device, a navigation device, a media device, a laptop computer, a desktop computer, a tablet computer, a wearable computer, a server, a network-attached storage (NAS) device, a smart appliance or other internet of things (IoT) device, a medical device, a vehicle-based communication system, a radar, a radio apparatus, and so forth.

The base station 104 communicates with the computing device 102 via the wireless link 106, which can be implemented as any suitable type of wireless link. Although depicted as a tower of a cellular network, the base station 104 can represent or be implemented as another device, such as a satellite, a server device, a terrestrial television broadcast tower, an access point, a peer-to-peer device, a mesh network node, and so forth. Therefore, the computing device 102 can communicate with the base station 104 or another device via a wireless connection, or a combination of a wireless connection and a wired connection.

The wireless link 106 can include a downlink of data or control information communicated from the base station 104 to the computing device 102, or an uplink of other data or control information communicated from the computing device 102 to the base station 104. The wireless link 106 can be implemented using any suitable communication protocol or standard, such as second-generation (2G), third-generation (3G), fourth-generation (4G), or fifth-generation (5G) cellular; IEEE 802.11 (e.g., Wi-Fi™); IEEE 802.15 (e.g., Bluetooth™); IEEE 802.16 (e.g., WiMAX™); and so forth. In some implementations, the base station 104 is a power source and the wireless link 106 wirelessly provides power from the base station 104 to the computing device 102.

As shown, the computing device 102 includes an application processor 108 and a computer-readable storage medium 110 (CRM 110). The application processor 108 can include any type of processor, such as a multi-core processor, that executes processor-executable code stored by the CRM 110. The CRM 110 can include any suitable type of data storage media, such as volatile memory (e.g., random access memory (RAM)), non-volatile memory (e.g., Flash memory), optical media, magnetic media (e.g., disk), and so forth. In the context of this disclosure, the CRM 110 is implemented to store instructions 112, data 114, and other information of the computing device 102, and thus does not include transitory propagating signals or carrier waves.

The computing device 102 can also include input/output ports 116 (I/O ports 116) and a display 118. The I/O ports 116 enable data exchanges or interaction with other devices, networks, or users. The I/O ports 116 can include serial ports (e.g., universal serial bus (USB) ports), parallel ports, audio ports, infrared (IR) ports, user interface ports such as a touchscreen, and so forth. The display 118 presents graphics of the computing device 102, such as a user interface associated with an operating system, program, or application. Alternately or additionally, the display 118 can be implemented as a display port or virtual interface, through which graphical content of the computing device 102 is presented.

A wireless transceiver 120 of the computing device 102 provides connectivity to respective networks and other electronic devices connected therewith. Alternately or additionally, the computing device 102 can include a wired transceiver, such as an Ethernet or fiber optic interface for communicating over a local network, intranet, or the Internet. The wireless transceiver 120 can facilitate communication over any suitable type of wireless network, such as a wireless local area network (LAN) (WLAN), peer-to-peer (P2P) network, mesh network, cellular network, wireless wide-area-network (WWAN), and/or wireless personal-area-network (WPAN). In the context of the example environment 100, the wireless transceiver 120 enables the computing device 102 to communicate with the base station 104 and networks connected therewith. However, the wireless transceiver 120 can also enable the computing device 102 to communicate "directly" with other devices or networks.

The wireless transceiver 120 includes circuitry and logic for transmitting and receiving communication signals via an antenna array 122. Components of the wireless transceiver 120 can include amplifiers, switches, mixers, analog-to-digital converters, filters, and so forth for conditioning the communication signals (e.g., for generating or processing signals). The wireless transceiver 120 can also include logic to perform in-phase/quadrature (I/Q) operations, such as synthesis, encoding, modulation, decoding, demodulation, and so forth. In some cases, components of the wireless transceiver 120 are implemented as separate receiver and transmitter entities. Additionally or alternatively, the wireless transceiver 120 can be realized using multiple or different sections to implement respective receiving and transmitting operations (e.g., separate transmit and receive chains). In general, the wireless transceiver 120 processes data and/or signals associated with communicating data of the computing device 102 over the antenna array 122.

The wireless transceiver 120 also includes a radio-frequency integrated circuit (IC) 124, a processor 126, and interface circuitry 128. The interface circuitry 128 couples the radio-frequency integrated circuit 124 to the processor 126. In some implementations, at least a portion of the interface circuitry 128 includes a resource-constrained interface. The resource-constrained interface can prevent the wireless transceiver 120 from propagating information from multiple receive chains of the radio-frequency integrated circuit 124 to the processor 126 in an independent and parallel (or in an independent and concurrent) manner.

For example, the resource-constrained interface can have a limited quantity of communication paths (e.g., a limited quantity of electrical connectors) between at least two circuits for handling reception operations that involve propagating receive signals between the at least two circuits. The two circuits can include the radio-frequency integrated circuit 124 and the processor 126, the radio-frequency integrated circuit 124 and another integrated circuit, or the other integrated circuit and the processor 126. The limited quantity of communication paths can be less than the quantity of receive signals to be propagated to perform digital beamforming, for instance. In such cases, there are not enough communication paths to independently propagate the receive signals in parallel.

Additionally or alternatively, the resource-constrained interface can have a relatively narrow bandwidth that is smaller than a bandwidth of a radar receive signal. As an example, the bandwidth of the resource-constrained interface can be on the order of a hundred megahertz (e.g., approximately 100 MHz), while the bandwidth of the radar receive signal can be on the order of gigahertz (GHz) (e.g., one gigahertz or more). As such, there is not sufficient bandwidth to independently propagate the radar receive signal directly without losing information. To address these challenges arising from a limited quantity of communication paths or bandwidth limitations, techniques described herein for multiplexing radar beat signals may enable information from multiple receive chains to propagate across such resource-constrained interface.

In some cases, the interface circuitry 128 includes a single communication path between at least two circuits within the wireless transceiver 120. Using this single communication path, the interface circuitry 128 can pass a signal for transmission, a received signal, and control information. In some implementations, the control information propagates through the communication path during a same time that the signal for transmission or the received signal propagates through the communication path. The interface circuitry 128 can include a serial interface and use Manchester encoding and decoding to pass the control information across the serial interface from the processor 126 to another circuit within the wireless transceiver 120.

The interface circuitry 128 can include other integrated circuits, such as a baseband integrated circuit and/or an intermediate-frequency integrated circuit. The baseband integrated circuit can include digital-to-analog converters and analog-to-digital converters, which convert baseband signals between a digital domain and an analog domain. The intermediate-frequency integrated circuit can include mixers that upconvert baseband signals to an intermediate frequency or that downconvert intermediate-frequency signals to baseband. The intermediate frequency can be on the order of several GHz, such as between approximately 5 and 15 GHz.

Figures 1, 5:
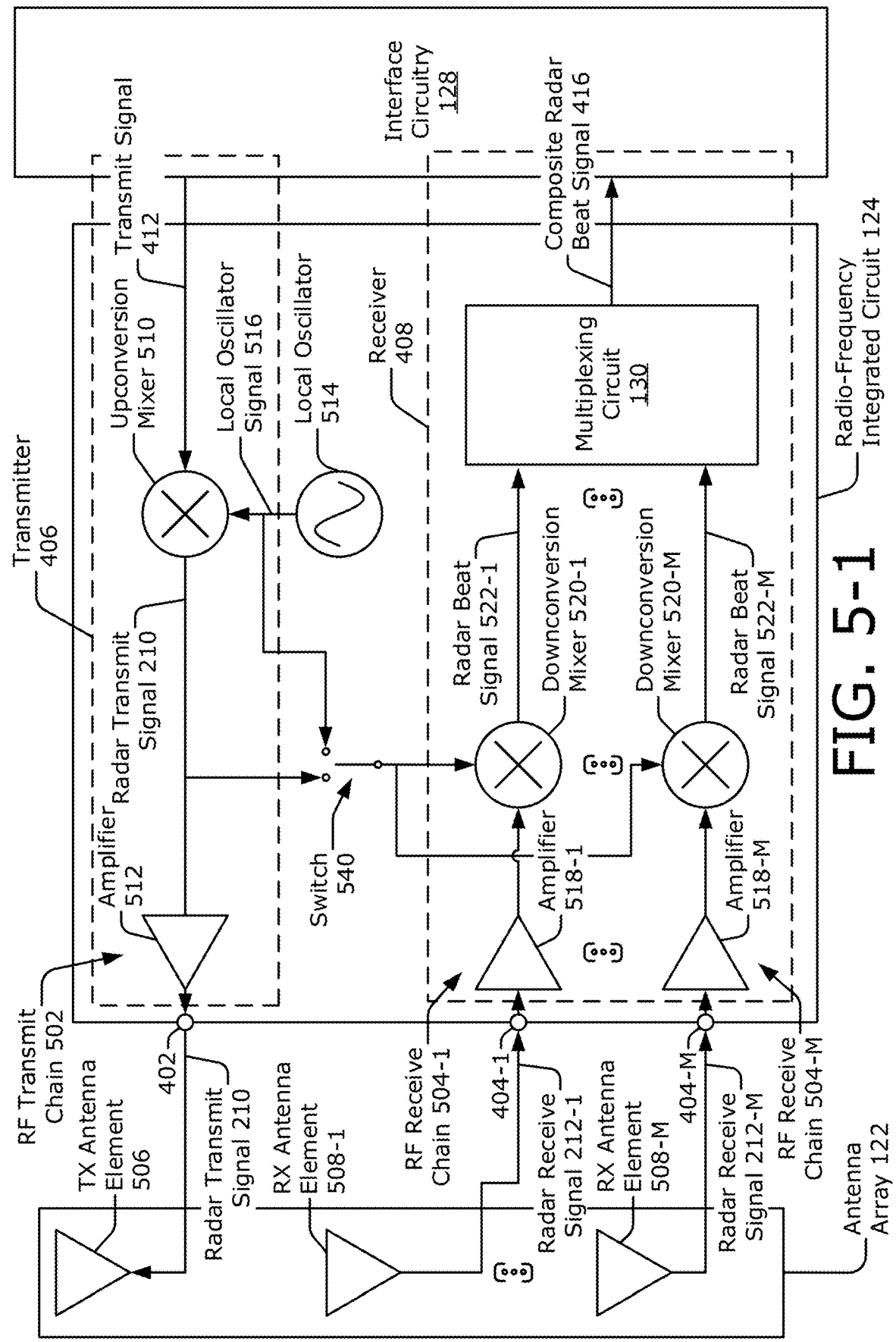
Figures 2, 5:
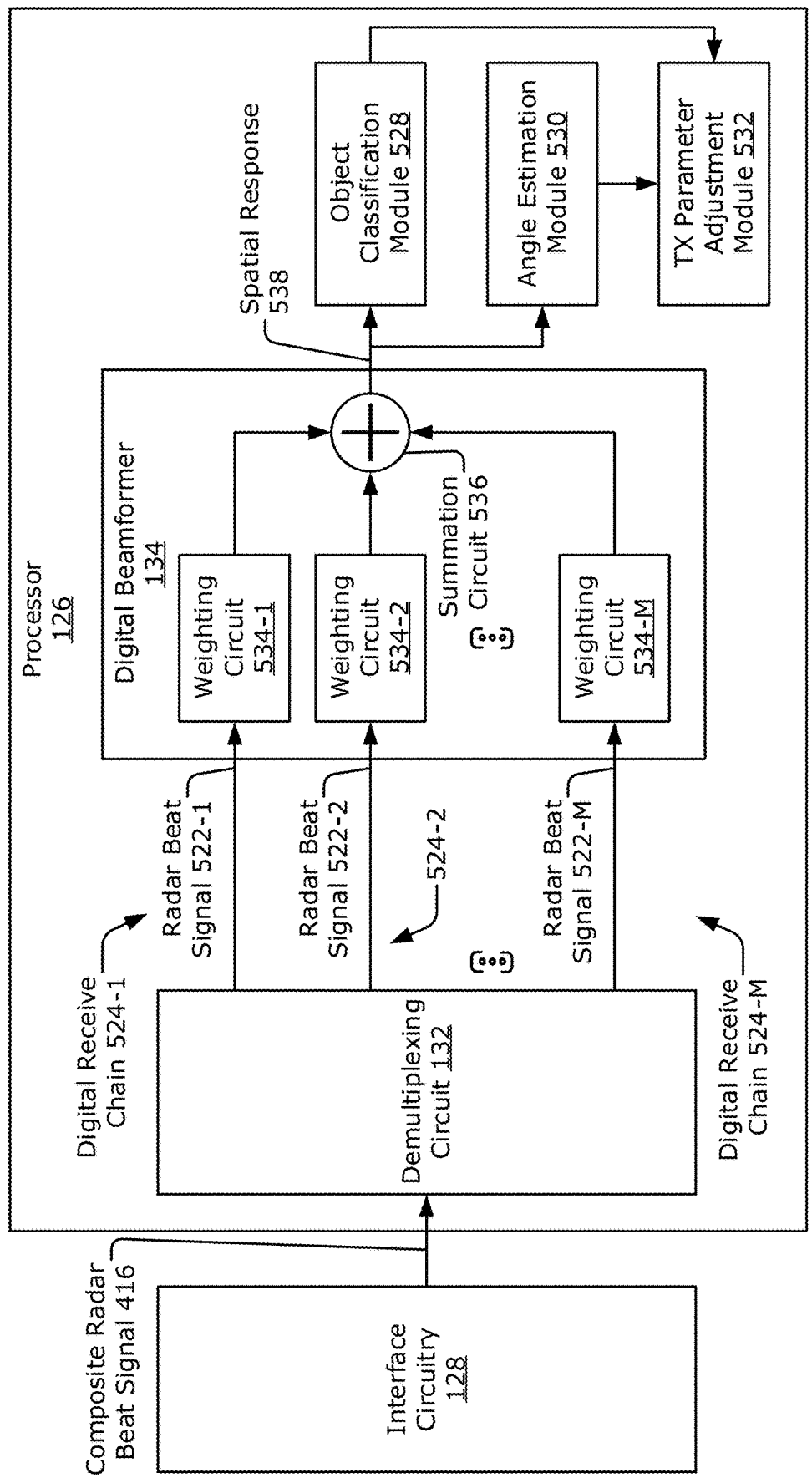

The radio-frequency integrated circuit 124 upconverts baseband signals or intermediate-frequency signals to a radio frequency and downconverts radio-frequency signals to baseband or intermediate frequencies. The radio frequency can include frequencies in the extremely-high frequency spectrum, such as frequencies between approximately 24 and 39 GHz, or more (for example, 57-66 GHz, 71-86 GHz, or frequencies therebetween or higher frequencies). The radio-frequency integrated circuit 124 includes multiple receive chains (as shown in FIG. 5-1) and a multiplexing circuit 130. The multiple receive chains receive multiple radar receive signals and perform beating operations that generate multiple radar beat signals by downconverting the radar receive signals using a radar transmit signal.

The multiplexing circuit 130 generates at least one composite radar beat signal by multiplexing radar beat signals together. By providing the composite radar beat signal to the interface circuitry 128, the interface circuitry 128 can propagate the radar beat signals in parallel from the radio-frequency integrated circuit 124 to the processor 126. In general, the multiplexing circuit 130 combines respective receive signals that propagate through the multiple receive chains into one or more composite signals. Although described with respect to radar beat signals, the multiplexing circuit 130 can also be used to multiplex multiple downlink signals together and support digital beamforming during wireless communication. Alternatively, the multiplexing circuit 130 can be bypassed during wireless communication.

The processor 126, which can comprise a modem or a digital signal processor, can be implemented within or separate from the wireless transceiver 120. Although not explicitly shown, the processor 126 can include a portion of the CRM 110 or can access the CRM 110 to obtain computer-readable instructions. The processor 126 controls the wireless transceiver 120 and enables wireless communication and object detection to be performed. For object detection, the processor 126 can determine a proximity (e.g., slant range) of an object or an angular position of the object. The processor 126 can provide communication data to the wireless transceiver 120 for transmission. The processor 126 can also process a baseband version of a signal accepted from the wireless transceiver 120 to generate data, which can be provided to other parts of the computing device 102 via a communication interface for wireless communication or object detection.

In general, the processor 126 can control an operational mode of the wireless transceiver 120 or have knowledge of an active operational mode. Different types of operational modes can include an object detection mode, a wireless communication mode, different transceiver modes (e.g., a transmit mode or a receive mode), different power modes (e.g., a low-power mode or a high-power mode), different resource control states (e.g., a connected mode, an inactive mode, or an idle mode), different modulation modes (e.g., a lower-order modulation mode such as quadrature phase-shift keying (QPSK) modes or higher-order modulation modes such as 64 quadrature amplitude modulation (QAM) or 256 QAM), and so forth. Additionally, the processor 126 can adjust one or more transmission parameters of the wireless transceiver 120.

The processor 126 can include baseband circuitry to perform high-rate sampling processes that can include analog-to-digital conversion, digital-to-analog conversion, gain correction, skew correction, frequency translation, demultiplexing, digital beamforming, MPE techniques, and so forth. In FIG. 1, the processor 126 includes a demultiplexing circuit 132 and a digital beamformer 134. The demultiplexing circuit 132 demultiplexes the composite radar beat signal to extract the radar beat signals.

The digital beamformer 134 processes the radar beat signals to generate a spatial response. Generally speaking, the digital beamformer 134 is implemented by the processor 126 due to the limited space available within other circuits of the wireless transceiver 120. However, other implementations can integrate the digital beamformer 134 within another circuit of the wireless transceiver 120. Consider an example in which the radio-frequency integrated circuit 124 includes a digital signal processor with sufficient processing power to implement the digital beamformer 134. In this case, the digital beamformer 134 is integrated within the radio-frequency integrated circuit 124 instead of the processor 126.

The processor 126 analyzes the spatial response to determine an angle to an object that reflected the radar transmit signal. Based on the determined angle, the processor 126 can adjust one or more transmission parameters of the wireless transceiver 120 that are used to transmit a subsequent uplink signal. In particular, the processor 126 can adjust the transmission parameter to control a power density of the uplink signal at the object and meet MPE guidelines.

In general the multiplexing circuit 130 and the demultiplexing circuit 132 are disposed within two separate circuits that are connected together by a resource-constrained interface. In the above implementation shown in FIG. 1, the resource-constrained interface exists between the radio-frequency integrated circuit 124 and the processor 126. As such, the multiplexing circuit 130 is implemented within the radio-frequency integrated circuit 124 and the demultiplexing circuit 132 is implemented within the processor 126.

In another implementation not shown, the resource-constrained interface exists across a portion of the interface circuitry 128, such as between the radio-frequency integrated circuit 124 and another integrated circuit disposed in the interface circuitry 128 (e.g., an intermediate-frequency integrated circuit). In this case, the multiplexing circuit 130 is disposed in the radio-frequency integrated circuit 124 and the demultiplexing circuit is disposed in the integrated circuit within the interface circuitry 128. In an additional implementation not shown, the resource-constrained interface exists between the integrated circuit disposed in the interface circuitry 128 and the processor 126. As such, the multiplexing circuit 130 is disposed within the interface circuitry 128 and the demultiplexing circuit 132 is disposed within the processor 126. Depending on where the multiplexing circuit 130 or the demultiplexing circuit 132 are implemented within the wireless transceiver 120, these circuits can be implemented using analog components, digital components, or a combination thereof.

Figures 1, 2:
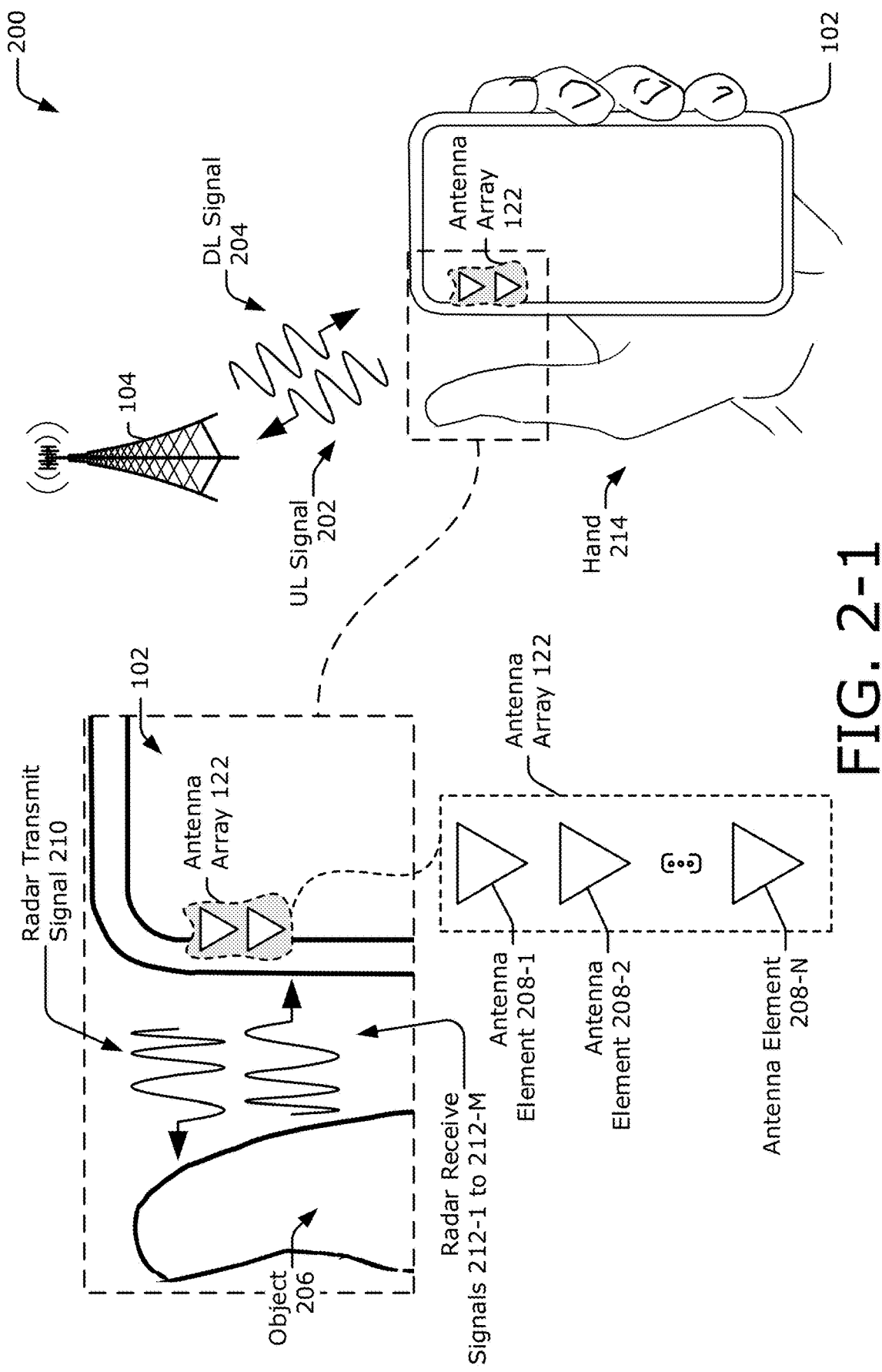
Figure 2:
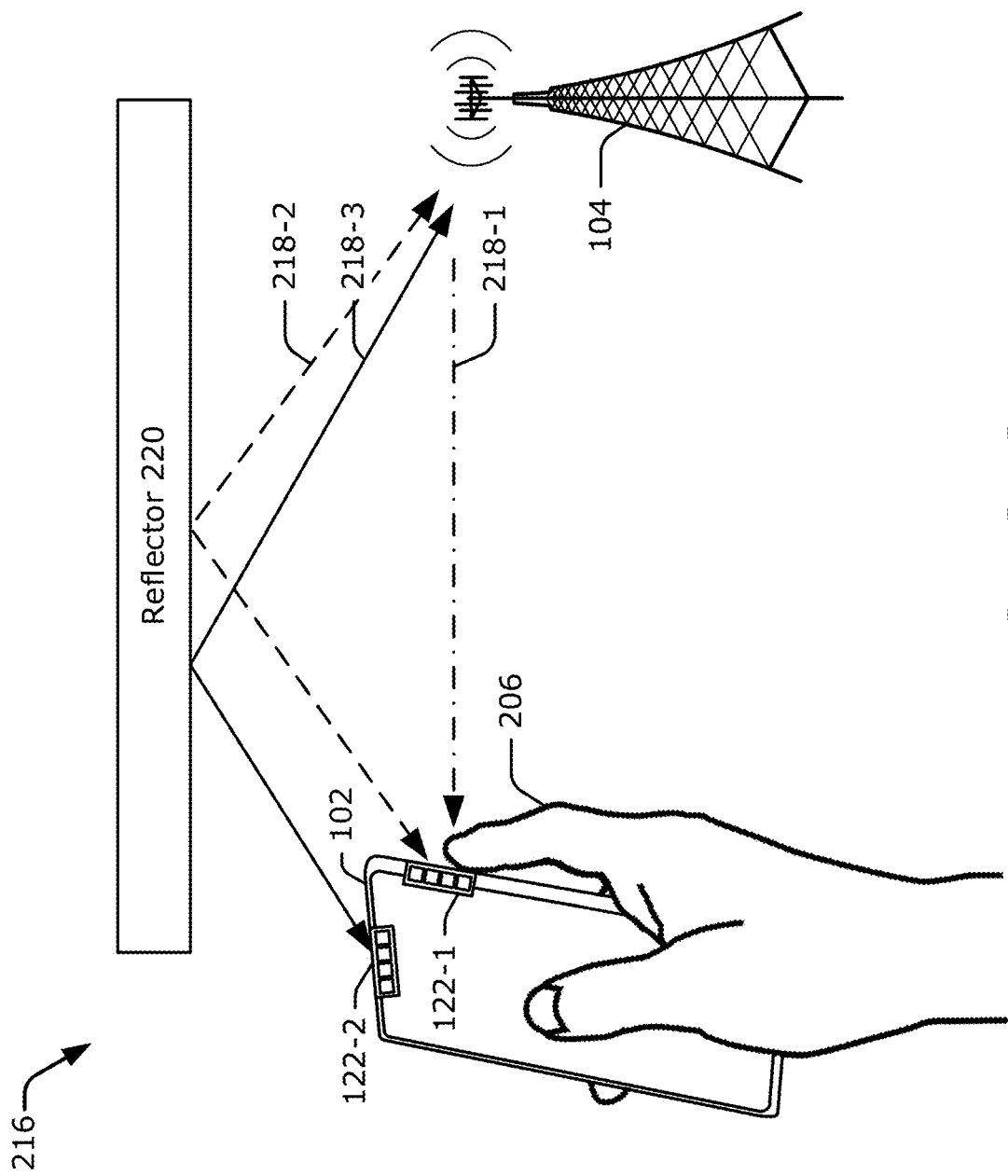

FIG. 2-1 illustrates an example operating environment 200 for the computing device 102. In the example environment 200, a hand 214 of a user holds the computing device 102. In one aspect, the computing device 102 communicates with the base station 104 by transmitting an uplink signal 202 (UL signal 202) or receiving a downlink signal 204 (DL signal 204) via the antenna array 122. A user's thumb, however, can represent a proximate object 206 that may be exposed to radiation via the uplink signal 202 and obstruct at least a portion of the antenna array 122.

The antenna array 122 includes multiple antenna elements 208, such as antenna elements 208-1, 208-2 . . . 208-N with N representing a positive integer greater than two. The antenna array 122 can be a linear antenna array or a multi-dimensional antenna array, and can be configured for beam management techniques, such as beam determination, beam measurement, beam reporting, or beam sweeping. A distance between the antenna elements 208 within the antenna array 122 can be based on frequencies that the wireless transceiver 120 emits. For example, the antenna elements 208-1 to 208-N can be spaced apart by approximately half a wavelength from one another (e.g., by approximately half a centimeter (cm) apart for frequencies around 30 GHz). The antenna elements 208-1 to 208-N can be implemented using any type of antenna, including patch antennas, dipole antennas, bowtie antennas, or combinations thereof.

To detect whether the object 206 exists or is within a detectable range and angle, the computing device 102 transmits a radar transmit signal 210 via at least one antenna element 208 of the antenna array 122. The radar transmit signal 210 can be a frequency-modulated continuous-wave (FMCW) signal or a frequency-modulated pulsed signal. The type of frequency modulation can include a linear frequency modulation, a triangular frequency modulation, a sawtooth frequency modulation, and so forth.

The computing device 102 additionally receives, via two or more other antenna elements 208 of the antenna array 122, two or more radar receive signals 212-1 to 212-M, where M represents a positive integer greater than one. The radar receive signals 212-1 to 212-M represent portions of the radar transmit signal 210 that are reflected by the object 206 and individually received by the antenna elements 208 of the antenna array 122. Due to different physical locations of the antenna elements 208 and a scattering of the radar transmit signal 210, the radar receive signals 212-1 to 212-M can have different phases relative to each other. In some cases, the radar receive signals 212-1 to 212-M are received during a portion of time that the radar transmit signal 210 is transmitted. Based on the radar receive signals 212-1 to 212-M, a range and an angle to the object 206 can be determined.

In general, quantities of antenna elements 208-1 to 208-M that are used for transmission or reception can vary based on an operational mode of the wireless transceiver 120 or vary over time for a same operational mode. During the object detection mode, for example, one of the antenna elements 208-1 to 208-N are used for transmission and at least another one of the antenna elements 208-1 to 208-N is used for reception. During reception, a single antenna element 208 can be used to enable the computing device 102 to determine the range to the object 206. Alternatively or additionally, at least two antenna elements 208 can be used to enable the computing device 102 to determine an angle to the object. In contrast, during the wireless communication mode that uses time-division duplexing, all of the antenna elements 208-1 to 208-N can be used to transmit the uplink signal 202 during a first time and all of the antenna elements 208-1 to 208-N can be used to receive the downlink signal 204 during a second time. In other words, the wireless transceiver 120 dynamically uses any quantity of the antenna elements 208-1 to 208-M for transmission and reception.

FIG. 2-2 illustrates another example operating environment 216 for the computing device 102. In the depicted configuration, the computing device 102 includes antenna arrays 122-1 and 122-2. Through the antenna arrays 122-1 and 122-2, the computing device 102 can communicate with the base station 104 through multiple signal paths 218-1 to 218-3. A first signal path 218-1 represents a direct signal path between the antenna array 122-1 and the base station 104. A second signal path 218-2 represents an indirect signal path between the antenna array 122-1, a reflector 220, and the base station 104. A third signal path 218-3 represents an indirect signal path between the antenna array 122-2, the reflector 220, and the base station 104.

In the depicted environment, a finger 206 blocks the first signal path 218-1. Through object detection, the computing device 102 determines that the antenna array 122-1 is obstructed. As such, the computing device 102 can adjust transmission parameters for the uplink signal 202 based on the detection. In some implementations, the transmission parameters specify a different beam steering angle that enables the uplink signal 202 to be transmitted via the antenna array 122-1 using the second signal path 218-2 instead of the first signal path 218-1. The beam steering angle can decrease radiation exposure at the finger 206 by directing a main-lobe of the uplink signal 202 away from the finger 206. Additionally or alternatively, a transmit power for the uplink signal 202 can be reduced for the second signal path 218-2 or the first signal path 218-1. In other situations, the transmission parameters can specify a different antenna array 122 for transmitting the communication signal. For example, the antenna array 122-2 can be used instead of the antenna array 122-1 to transmit the uplink signal 202 using the third signal path 218-3. By adjusting the transmission parameters, the computing device 102 can maintain communication with the base station 104 while ensuring compliance. An example sequence for switching between a wireless communication mode and an object detection mode is further described with respect to FIG. 3.

Figure 3:
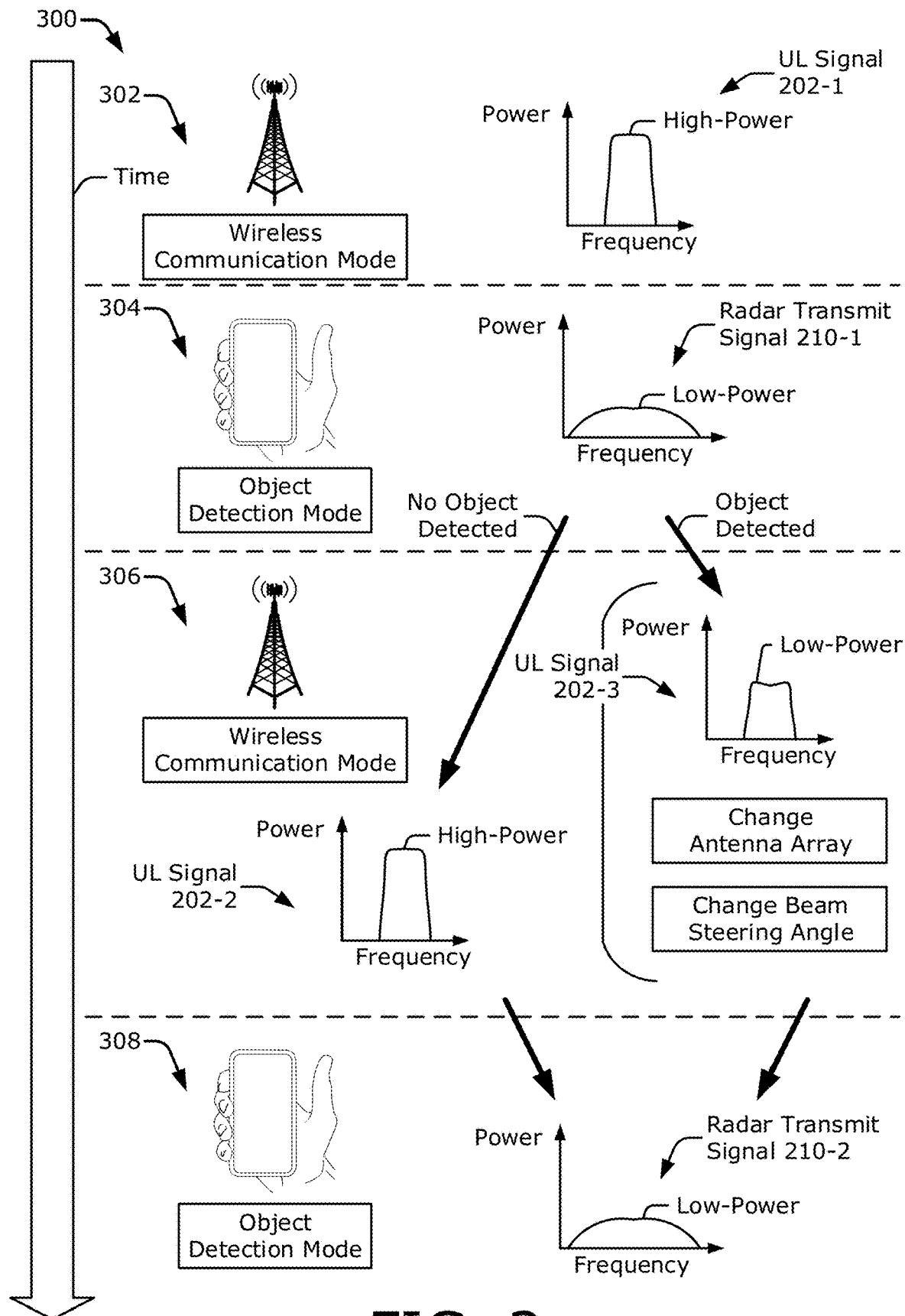
FIG. 3 illustrates an example sequence flow diagram for operating a computing device.

FIG. 3 illustrates an example sequence flow diagram 300 for operating the computing device 102, with time elapsing in a downward direction. Examples of a wireless communication mode are shown at 302 and 306, and examples of an object detection mode are shown at 304 and 308. The object detection modes can occur at fixed time intervals, between active data cycles that occur during wireless communication, at predetermined times as set by the processor 126, during an unused random access channel (RACH) time slot, as part of an initialization process before wireless communications occur, responsive to detection of device movement, or based on indications that the user may be proximate to the device (e.g., based on the wireless transceiver 120 observing a decrease in power in a downlink signal 204 or the application processor 108 determining that the user is interacting with the display 118 of the computing device 102), or during other times or in response to other events. In some situations, the computing device 102 multiplexes radar beat signals during the object detection modes at 304 and/or 308 to determine an angle to the object. However, the multiplexing of the radar beat signals is not necessary for some types of radar sensing, such as determining a range to the object.

At 302, the wireless transceiver 120 transmits a high-power (e.g., normal) uplink signal 202-1 configured to provide sufficient range to a destination, such as a base station 104. After transmitting the uplink signal 202-1, the radar transmit signal 210-1 is transmitted via the wireless transceiver 120 and the antenna array 122 at 304. As described above, a radar transmit signal 210 may enable the computing device 102 to detect an object 206 and determine if the object 206 is near the computing device 102. In this case, the radar transmit signal 210-1 is represented by a low-power wide-band signal. Based on a detection, the wireless transceiver 120 can adjust a transmission parameter for a subsequent uplink signal 202 to account for MPE compliance guidelines.

The object detection mode can also determine the range and the angle to the object 206, thereby enabling transmission of the uplink signal 202 to comply with range-dependent and angle-dependent guidelines, such as a maximum power density. Because power density is proportional to transmit power and inversely proportional to range, an object 206 at a closer range is exposed to a higher power density than another object 206 at a farther range for a same transmit power level. Therefore, a similar power density at the object 206 can be achieved by increasing the transmit power level if the object 206 is at a farther range and decreasing the transmit power level if the object 206 is at a closer range The power density at the object 206 is also dependent upon a beam steering angle (e.g., an angle of a main lobe of a radiation pattern). Directing the beam steering angle away from the angle to the object decreases the power density at the object 206, for instance. By controlling transmission power and/or the beam steering angle, the wireless transceiver 120 can customize transmission of the uplink signal 202 to enable the power density at the object 206 to be below the maximum power density. At the same time, because the range and the angle is known, the transmit power level can be increased to a level that facilitates wireless communication and comports with the compliance guideline.

At 306, the wireless transceiver 120 transmits a subsequent uplink signal 202. In the depicted example, a high-power uplink signal 202-2 is transmitted if an object 206 is not detected. Alternatively, a low-power uplink signal 202-3 is transmitted if the object 206 is detected. The low transmit power can be, for example, between approximately five and twenty decibel-milliwatts (dBm) less than the high-power signal at 302. In addition to or instead of changing a power of the subsequent uplink signal 202, the uplink signal 202 can be transmitted using a different antenna array within the computing device 102, using a different beam steering angle, using a different frequency, or using a different communication protocol (e.g., relative to the antenna array, the beam steering angle, the frequency, or the communication protocol used to transmit the uplink signal 202-1 at 302). Although not shown, the wireless transceiver 120 can alternatively skip the wireless communication mode at 306 and perform another object detection mode using another antenna array or a different transmit power level to detect objects 206 at various locations or distances around the computing device 102.

At 308, the wireless transceiver 120 and the antenna array 122 transmit another radar transmit signal 210-2 to attempt to detect the object 206. By scheduling multiple radar transmit signals 210 over some time period, transmission of the uplink signal 202 can be dynamically adjusted based on a changing environment or movement by the object 206. Furthermore, appropriate adjustments can be made to balance communication performance with compliance or radiation requirements.

The sequence described above can also be applied to other antenna arrays within the computing device 102. The other antenna arrays can transmit multiple radar transmit signals 210 sequentially or in parallel. To enable digital beamforming for object detection, the wireless transceiver 120 multiplexes multiple radar beat signals together, as further described with respect to FIGS. 4 and 5-1.

Figure 4:
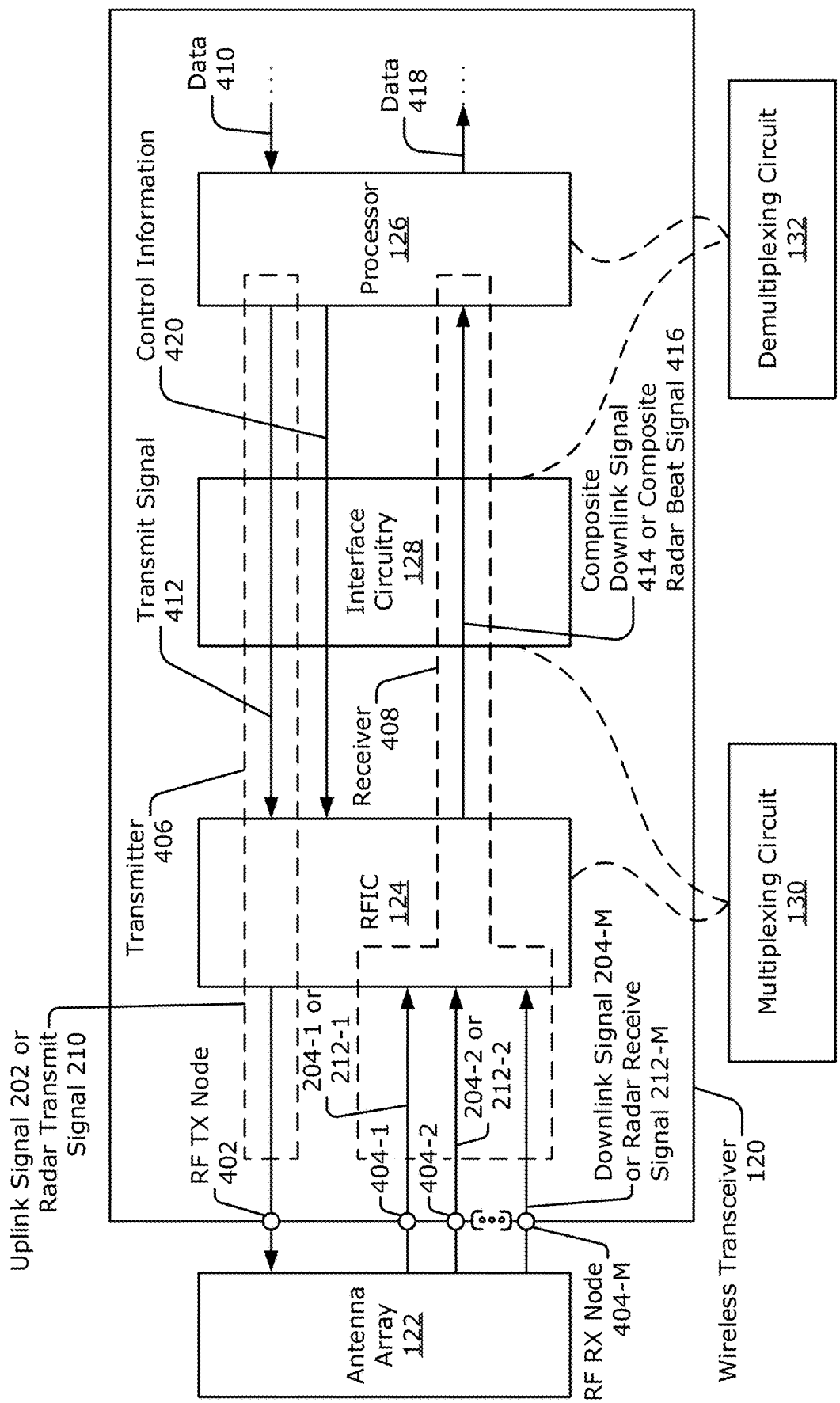
FIG. 4 illustrates an example wireless transceiver for multiplexing radar beat signals, including a processor, a radio-frequency integrated circuit, and a multiplexing circuit.

FIG. 4 illustrates an example wireless transceiver 120 for multiplexing radar beat signals. The wireless transceiver 120 includes at least one radio-frequency transmit (RF TX) node 402 and two or more radio-frequency receive (RF RX) nodes 404, such as radio-frequency receive nodes 404-1, 404-2 . . . 404-M. The radio-frequency transmit node 402 and the radio-frequency receive nodes 404-1 to 404-M are coupled to respective antenna elements 208-1 to 208-N of the antenna array 122 (shown in FIG. 2-1). The wireless transceiver 120 also includes a transmitter 406 and a receiver 408, portions of which are disposed within the radio-frequency integrated circuit, the interface circuitry 128, and the processor 126.

During operation, the processor 126 obtains data 410 from the computing device 102. The data 410 can include communication data that is to be transmitted to another entity, such as the base station 104. In some situations, the data 410 includes a request from a radar-based function or application of the computing device 102 to perform object detection. As an example, the data 410 can be provided by the application processor 108. For wireless communication, the processor 126 provides the data 410 to the interface circuitry 128 (e.g., to the transmitter 406). Note, however, that object detection processes may be initiated by the processor 126 autonomously or separately from the application processor 108. For example, the processor 126 may determine a beamforming pattern without explicit direction from the application processor 108.

The interface circuitry 128 provides a transmit signal 412 to the radio-frequency integrated circuit 124. Additionally, the interface circuitry 128 provides control information 420 to the radio-frequency integrated circuit 124. In some implementations, the processor 126 uses frequency-division multiplexing to enable both the transmit signal 412 and the control information 420 to be passed by a single communication path within the interface circuitry 128. In other implementations, the transmit signal 412 and the control information 420 are passed to the radio-frequency integrated circuit 124 using separate communication paths.

The control information 420 includes at least one transmission parameter and/or at least one reception parameter that configures at least one component within the transmitter 406 or the receiver 408, respectively. As an example, the control information 420 specifies a gain of an amplifier (e.g., a power amplifier, a low-noise amplifier, or a variable-gain amplifier), phase-shift information for an analog phase shifter, an operational state of a switch that connects an antenna element 208 of a selected antenna array 122 to the transmitter 406 or the receiver 408, and so forth.

Depending on the operational mode of the wireless transceiver 120, the transmit signal 412 can be used to generate the uplink signal 202 or the radar transmit signal 210. The processor 126 or the interface circuitry 128 can generate the transmit signal 412. In some implementations, the interface circuitry 128 further conditions the transmit signal 412. For example, the interface circuitry 128 converts the transmit signal 412 from a digital domain to an analog domain, modulates a characteristic of the transmit signal 412 based on the data 410, filters the transmit signal 412, or upconverts the transmit signal 412.

To generate the uplink signal 202 or the radar transmit signal 210, the radio-frequency integrated circuit 124 upconverts the transmit signal 412 to a radio frequency from baseband or an intermediate frequency. The radio-frequency integrated circuit 124 provides the uplink signal 202 or the radar transmit signal 210 to the antenna array 122 for transmission.

The antenna array 122 can additionally receive multiple downlink signals 204-1, 204-2 . . . 204-M or the radar receive signals 212-1 to 212-M using multiple antenna elements 208. According to a wireless communication mode, the radio-frequency integrated circuit 124 downconverts the downlink signals 204-1 to 204-M using a local oscillation signal. In some implementations, the radio-frequency integrated circuit 124 includes an analog beamformer that adjusts phases of the multiple downlink signals 204-1 to 204-M and combines the phase-shifted downlink signals 204-1 to 204-M to generate a composite downlink signal 414. In other implementations, the multiplexing circuit 130 generates the composite downlink signal 414 by multiplexing the multiple downlink signals 204-1 to 204-M together, for example for digital beamforming.

For object detection, the radio-frequency integrated circuit 124 performs beating operations using the radar receive signals 212-1 to 212-M and the radar transmit signal 210 to generate radar beat signals (shown in FIG. 5-1). The multiplexing circuit 130 multiplexes the radar beat signals together to generate a composite radar beat signal 416. As described above with respect to FIG. 1, the multiplexing circuit 130 can be implemented in the radio-frequency integrated circuit 124 or within another integrated circuit of the interface circuitry 128. Depending on the implementation, the analog beamformer can also adjust phases of the radar receive signals 212-1 to 212-M prior the multiplexing circuit 130 generating the composite radar beat signal 416.

The interface circuitry 128 provides the composite downlink signal 414 or the composite radar beat signal 416 to the demultiplexing circuit 132, which can be implemented within the processor 126 or implemented within another integrated circuit of the interface circuitry 128 as described above with respect to FIG. 1. In some implementations, the interface circuitry 128 further conditions the composite downlink signal 414 or the composite radar beat signal 416. For example, the interface circuitry 128 can further downconvert the composite downlink signal 414 or the composite radar beat signal 416, filter the composite downlink signal 414 or the composite radar beat signal 416, or convert the composite downlink signal 414 or the composite radar beat signal 416 from the analog domain to the digital domain.

The demultiplexing circuit 132 demultiplexes the composite downlink signal 414 and extracts the downlink signals 204-1 to 204-M for the wireless communication mode. Additionally or alternatively, the demultiplexing circuit 132 demultiplexes the composite radar beat signal 416 and extracts the radar beat signals associated with at least a portion of the antenna elements 208-1 to 208-N for the object detection mode.

The processor 126 obtains and analyzes the demultiplexed downlink signals 204-1 to 204-M or the demultiplexed radar beat signals to generate data 418 for the computing device 102. The data 418 can be provided to the processor 108 to communicate data to a user or provide a proximity alert. The processor 126 can also use digital beamforming to analyze the demultiplexed signals and determine an angle to the base station for the wireless communication mode or determine an angle to the object 206 for the object detection mode. Components of the transmitter 406 and the receiver 408 are further described with respect to FIG. 5-1.

FIG. 5-1 illustrates an example radio-frequency integrated circuit 124 for multiplexing radar beat signals. Although described with respect to the object detection mode, the components in FIG. 5-1 can perform analogous operations for the wireless communication mode.

In the depicted configuration, the radio-frequency integrated circuit 124 includes at least one radio-frequency transmit chain 502 disposed in the transmitter 406 and multiple radio-frequency receive chains 504-1 to 504-M disposed in the receiver 408. The radio-frequency transmit chain 502 is coupled to a transmit antenna element 506 of the antenna array 122. The radio-frequency receive chains 504-1 to 504-M are respectively coupled to receive antenna elements 508-1 to 508-M of the antenna array 122. Together, the transmit antenna element 506 and the receive antenna elements 508-1 to 508-M represent at least a portion of the antenna elements 208-1 to 208-N shown in FIG. 2-1.

The radio-frequency transmit chain 502 includes an upconversion mixer 510 and an amplifier 512 (e.g., a power amplifier). One input of the upconversion mixer 510 is coupled to a local oscillator 514, and another input of the upconversion mixer 510 is coupled to the interface circuitry 128. The local oscillator 514 can be implemented as a voltage-controlled oscillator, which generates a local oscillator signal 516. For the wireless communication mode, the local oscillator 514 generates the local oscillator signal 516 to have a steady frequency that does not substantially change over time. For the object detection mode, however, the local oscillator 514 generates the local oscillator signal 516 to have a frequency that changes over time (e.g., linearly increases or decreases over time). Using the local oscillator signal 516, the upconversion mixer 510 increases a frequency of the transmit signal 412 to generate the radar transmit signal 210. The amplifier 512 further amplifies the radar transmit signal 210 for transmission.

The radio-frequency receive chains 504-1 to 504-M respectively include amplifiers 518-1 to 518-M (e.g., low-noise amplifiers) and downconversion mixers 520-1 to 520-M. The amplifiers 518-1 to 518-M are respectively coupled to the receive antenna elements 508-1 to 508-M and amplify the radar receive signals 212-1 to 212-M. Inputs of the downconversion mixers 520-1 to 520-M are coupled to a switch 540. The switch 540 dynamically connects the inputs of the downconversion mixers 520-1 to 520-M to an output of the upconversion mixer 510 for the object detection mode or an output of the local oscillator 514 for the wireless communication mode. Another input of each of the downconversion mixers 520-1 to 520-M is coupled to a respective amplifier 518-1 to 518-M. Outputs of the downconversion mixers 520-1 to 520-M are coupled to the multiplexing circuit 130. The downconversion mixers 520-1 to 520-M downconvert the radar receive signals 212-1 to 212-M using the radar transmit signal 210 provided by the upconversion mixer 510. By using the radar transmit signal 210, the downconversion mixers 520-1 to 520-M perform beating operations that generate radar beat signals 522-1 to 522-M.

In example implementations, the radar beat signals 522-1 to 522-M are time-domain signals with respective frequencies that are approximately equal to respective differences between a frequency of the radar transmit signal 210 and respective frequencies of the radar receive signals 212-1 to 212-M. Based on these differences and assuming a detection range for the object detection mode is approximately 30 centimeters, the frequencies of the radar beat signals 522-1 to 522-M can be less than approximately 1 MHz, for instance. Accordingly, the frequencies of the radar beat signals 522-1 to 522-M are proportional to a distance between the antenna array 122 and at least a portion of the object 206 that reflects the radar transmit signal 210. Due to the beating operation, bandwidths of the radar beat signals 522-1 to 522-M are narrower than bandwidths of the corresponding radar receive signals 212-1 to 212-M. In some cases, these bandwidths are also narrower than bandwidths of the downlink signals 204-1 to 204-M, which can be on the order of hundreds of MHz. The radio-frequency receive chains 504-1 to 504-M provide the radar beat signals 522-1 to 522-M to the multiplexing circuit 130.

The multiplexing circuit 130 multiplexes the radar beat signals 522-1 to 522-M together to generate the composite radar beat signal 416, which is provided to the interface circuitry 128. Example approaches to generating the composite radar beat signal 416, which may be analog or digital, are described below with reference to FIGS. 6 to 9-2. The interface circuitry 128 passes the composite radar beat signal 416 to the demultiplexing circuit 132 using at least one communication path (not explicitly shown). In general, a quantity of communication paths across at least a portion of the interface circuitry 128 is fewer than a quantity of the radar beat signals 522-1 to 522-M (e.g., the quantity of communication paths is less than M).

The multiplexing circuit 130 can generate the composite radar beat signal 416 such that a bandwidth of the composite radar beat signal 416 is less than a bandwidth of the interface circuitry 128. If the bandwidth of the interface circuitry 128 is approximately 100 MHz, the bandwidth of the composite radar beat signal 416 can be less than 50 MHz, for instance. In some implementations, the bandwidth of the composite radar beat signal 416 can be on the order of a few MHz, such as less than 5 MHz. In general, the bandwidth of the composite radar beat signal 416 is dependent upon a quantity of the radar beat signals 522-1 to 522-M and/or a design of the multiplexing circuit 130, as further described with respect to FIG. 6. The composite radar beat signal 416 is provided to the demultiplexing circuit 132, as further described with respect to FIG. 5-2.

Certain of the figures discussed herein illustrate the RFIC 124 coupled to the antenna array 122. In some embodiments, each antenna array 122 is coupled to a respective RFIC 124. In some such embodiments, the antenna array 122 and the respective RFIC 124 are packaged together in the same module. In some embodiments, several antenna arrays (e.g., antenna arrays 122-1 and 122-2) are coupled to a common RFIC 124.

FIG. 5-2 illustrates an example processor 126 that supports multiplexing radar beat signals. In the depicted configuration, the processor 126 includes the demultiplexing circuit 132; digital receive chains 524-1, 524-2 . . . 524-M; and the digital beamformer 134. The processor 126 also includes an object classification module 528, an angle estimation module 530, and a transmission (TX) parameter adjustment module 532.

The interface circuitry 128 provides the composite radar beat signal 416 to the demultiplexing circuit 132. In some cases, the interface circuitry 128 or the processor 126 digitizes the composite radar beat signal 416 using an analog-to-digital converter prior to providing the composite radar beat signal 416 to the demultiplexing circuit 132.

The demultiplexing circuit 132 is coupled between the interface circuitry 128 and the digital receive chains 524-1 to 524-M. The demultiplexing circuit 132 demultiplexes the composite radar beat signal 416 to extract the radar beat signals 522-1, 522-2 . . . 522-M. To demultiplex the composite radar beat signal 416, the demultiplexing circuit 132 performs a reciprocal operation relative to a multiplexing operation performed by the multiplexing circuit 130. The demultiplexing circuit 132 provides the radar beat signals 522-1 to 522-M respectively to the digital receive chains 524-1 to 524-M.

The digital receive chains 524-1 to 524-M provide the radar beat signals 522-1 to 522-M to the digital beamformer 134. In some implementations, the digital receive chains 524-1 to 524-M further condition the radar beat signals 522-1 to 522-M (e.g., filter the radar beat signals 522-1 to 522-M).

The digital beamformer 134 includes digital weighting circuits 534-1, 534-2 . . . 534-M and at least one summation circuit 536. The digital weighting circuits 534-1 to 534-M apply complex weights to adjust amplitudes and/or phases of the radar beat signals 522-1 to 522-M. The summation circuit 536 combines the weighted radar beat signals 522-1 to 522-M to generate a spatial response 538. The spatial response 538 represents a composite amplitude of the radar beat signals 522-1 to 522-M for different beam steering angles formed across one or more angular dimensions (e.g., across an azimuth dimension, an elevation dimension, or both the azimuth dimension and the elevation dimension). The digital beamformer 134 provides the spatial response 538 to the object classification module 528 and the angle estimation module 530.

The object classification module 528 analyzes the spatial response 538 to determine whether or not the object 206 is likely associated with an animate object (e.g., a human) or an inanimate object (e.g., a table). Based on the spatial response 538, the object classification module 528 measures an amount of scattering observed from the object 206. In general, objects 206 with flat surfaces exhibit a smaller amount of scattering relative to objects 206 with curved surfaces. If the amount of scattering indicates that the object 206 is relatively flat, the object classification module 528 classifies the object 206 as an inanimate object. Alternatively, if the amount of scattering indicates that the object 206 is relatively curved, the object classification module 528 classifies the object 206 as a possible animate object.

The angle estimation module 530 analyzes the spatial response 538 to determine an angle to the object 206. As an example, the angle estimation module 530 can determine the angle to the object 206 based on an angle associated with a highest peak amplitude within the spatial response 538. Although not explicitly shown, the processor 126 can also include an object detection module that performs a Fast-Fourier Transform operation based on the radar beat signals 522-1 to 522-M or the spatial response 538. The object detection module can generate one or more range-Doppler maps for determining a range to the object 206 and a range rate of the object 206.

Information from the object classification module 528, the angle estimation module 530, and/or the object detection module can be provided to the transmission parameter adjustment module 532. Using this information, the transmission parameter adjustment module 532 adjusts a transmission parameter of the wireless transceiver 120 to meet targeted guidelines (e.g., MPE guidelines). Example transmission parameters include a transmit power level, a beam steering angle, a frequency, a selected antenna array, and/or a communication protocol. Upon detecting the object 206, for instance, the transmission parameter adjustment module 532 causes the wireless transceiver 120 to transmit a later uplink signal 202-3 with a lower power, as shown at 306 in FIG. 3. Alternatively or additionally, the transmission parameter adjustment module 532 causes the wireless transceiver 120 to transmit the later uplink signal 202 using another antenna array 122 that is not obstructed, such as the antenna array 122-2 of FIG. 2-2.

Although described with respect to an object detection mode, the components of FIGS. 5-1 and 5-2 can perform similar operations to enable digital beamforming for a wireless communication mode, which can enable the computing device 102 to determine an angle to the base station 104. In the wireless communication mode, however, inputs of the downconversion mixers 520-1 to 520-M of FIG. 5-1 are coupled to the local oscillator 514 instead of the output of the upconversion mixer 510. The radio-frequency integrated circuit 124 can also include a switching circuit (not shown) that can selectively connect the inputs of the downconversion mixers 520-1 to 520-M to the output of the upconversion mixer 510 based on the object detection mode or to the local oscillator 514 based on the wireless communication mode.

If the interface circuitry 128 includes more than one communication path that is available during reception, the multiplexing circuit 130 can alternatively multiplex the radar beat signals 522-1 to 522-M together in two or more groups to generate two or more composite radar beat signals 416. In some cases, this enables individual ones of the multiple composite radar beat signals 416 to have a smaller bandwidth relative to an implementation that generates a single composite radar beat signal 416.

The techniques described herein are also applicable to hybrid beamforming. In the case of hybrid beamforming, an analog beamformer within the radio-frequency integrated circuit 124 can combine two or more groups of radar receive signals 212-1 to 212-M together. Accordingly, the radar beat signals 522-1 to 522-M generated by the downconversion mixers 520-1 to 520-M represent versions of the combined radar receive signals. In this case, each of the radar beat signals 522-1 to 522-M are associated with a group of receive antenna elements, and the quantity of receive antenna elements 508 is greater than a quantity of radar beat signals 522.

Figure 6:
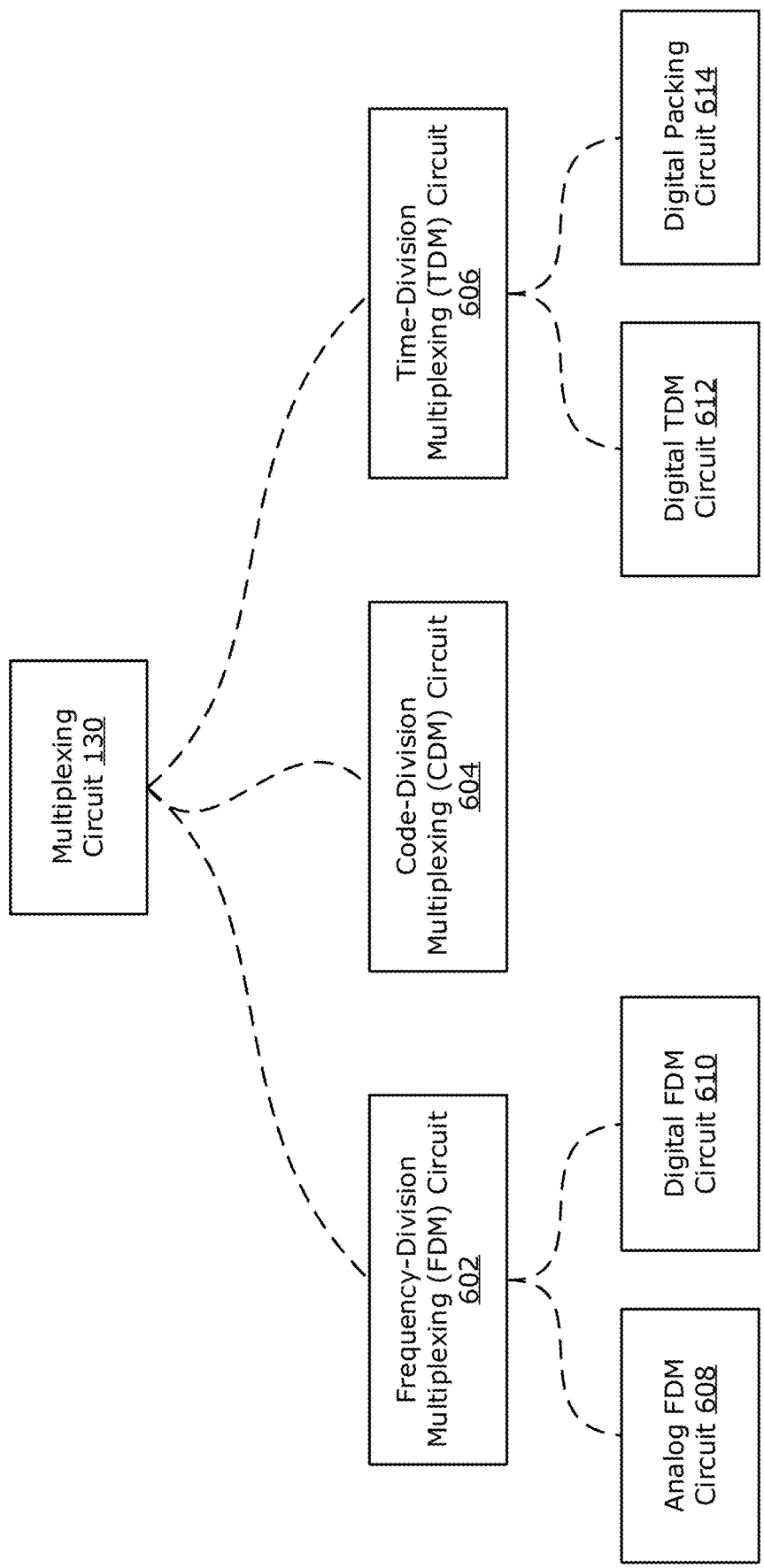
FIG. 6 illustrates different example types of multiplexing circuits for multiplexing radar beat signals.

FIG. 6 illustrates different example types of multiplexing circuits 130 for multiplexing radar beat signals. The multiplexing circuit 130 can be implemented as a frequency-division multiplexing (FDM) circuit 602, a code-division multiplexing (CDM) circuit 604, or a time-division multiplexing (TDM) circuit 606. Although not explicitly shown, the demultiplexing circuit 132 can be implemented using analogous circuits that perform a reciprocal operation relative to the multiplexing circuit 130.

Example types of frequency-division multiplexing circuits 602 include an analog frequency-division multiplexing circuit 608 and a digital frequency-division multiplexing circuit 610. The analog-frequency-division multiplexing circuit 608 performs frequency-division multiplexing in the analog domain to generate the composite radar beat signal 416 based on the radar beat signals 522-1 to 522-M. In contrast, the digital frequency-division multiplexing circuit 610 performs frequency-division multiplexing in the digital domain to generate the composite radar beat signal 416 based on the radar beat signals 522-1 to 522-M. The analog frequency-division multiplexing circuit 608 and the digital frequency-division multiplexing circuit 610 are further described with respect to FIGS. 7-1 and 7-2, respectively.

Generally speaking, a bandwidth of the composite radar beat signal 416 that is generated using frequency-division multiplexing is dependent upon a quantity of receive antenna elements 508-1 to 508-M (e.g., a quantity of the radar beat signals 522-1 to 522-M) and a detection range of the wireless transceiver 120. In cases in which a bandwidth of the composite radar beat signal 416 can be greater than a bandwidth of the interface circuitry 128, the multiplexing circuit 130 can alternatively be implemented using the code-division multiplexing circuit 604 or the time-division multiplexing circuit 606.

The code-division multiplexing circuit 604 performs code-division multiplexing to generate the composite radar beat signal 416 based on the radar beat signals 522-1 to 522-M. The code-division multiplexing circuit 604 is further described with respect to FIG. 8.

To further improve a signal-to-noise ratio of the composite radar beat signal 416, the multiplexing circuit 130 can be implemented using the time-division multiplexing circuit 606. The time-division multiplexing circuit 606 does not need to use a combiner circuit or a summation circuit to combine the radar beat signals 522-1 to 522-M together. As such, additional noise introduced via the combiner circuit or the summation circuit through folding can be mitigated.

Example types of time-division multiplexing circuits 606 include a digital time-division multiplexing circuit 612 and a digital packing circuit 614. The digital time-division multiplexing circuit 612 interleaves different time segments of the radar beat signals 522-1 to 522-M together to generate the composite radar beat signal 416. In contrast, the digital packing circuit 614 concatenates similar time segments of the radar beat signals 522-1 to 522-M together to generate the composite radar beat signal 416. The digital time-division multiplexing circuit 612 and the digital packing circuit 614 are further described with respect to FIGS. 9-1 and 9-2, respectively.

Figures 1, 7:
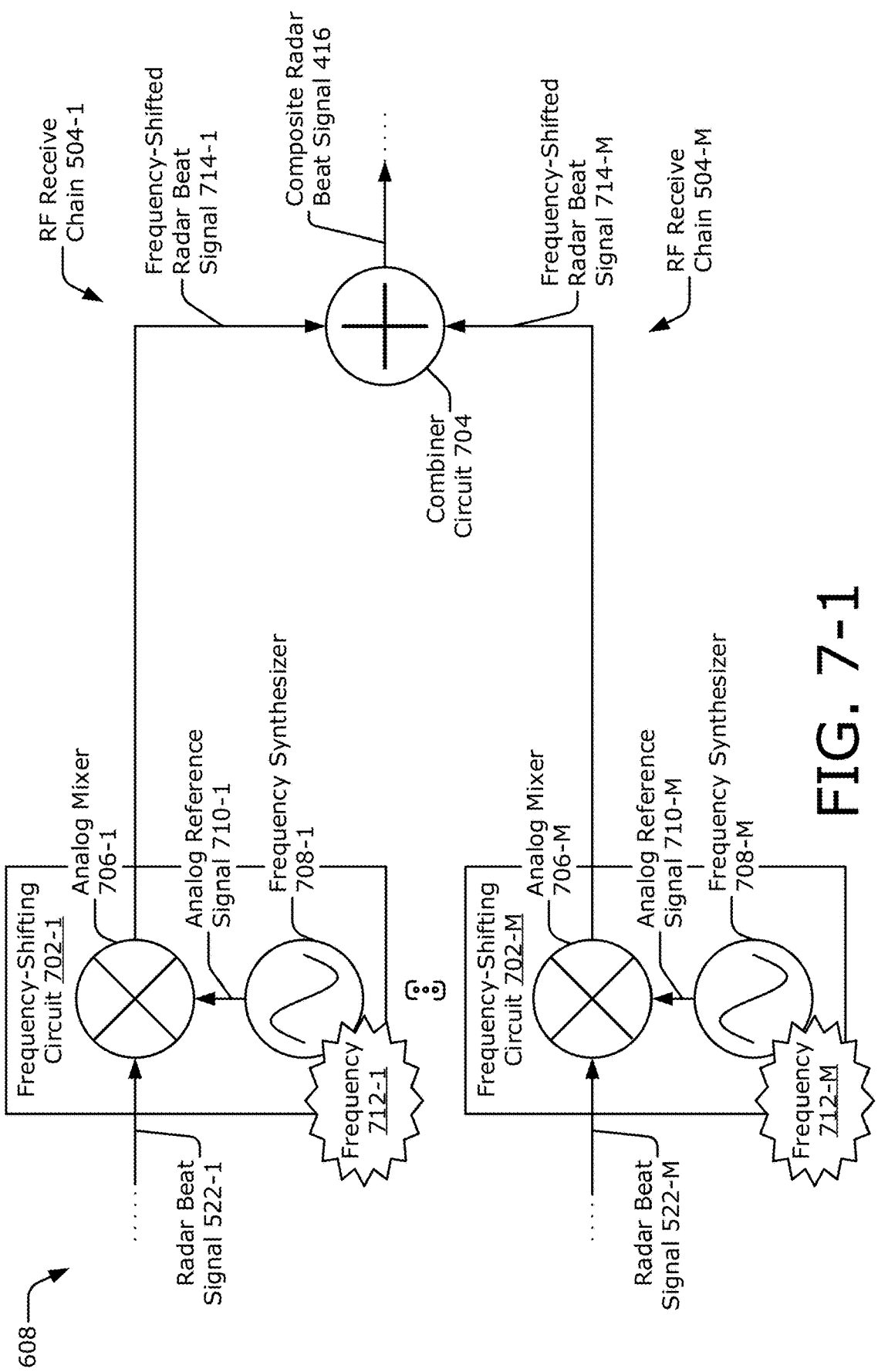
Figures 2, 7:
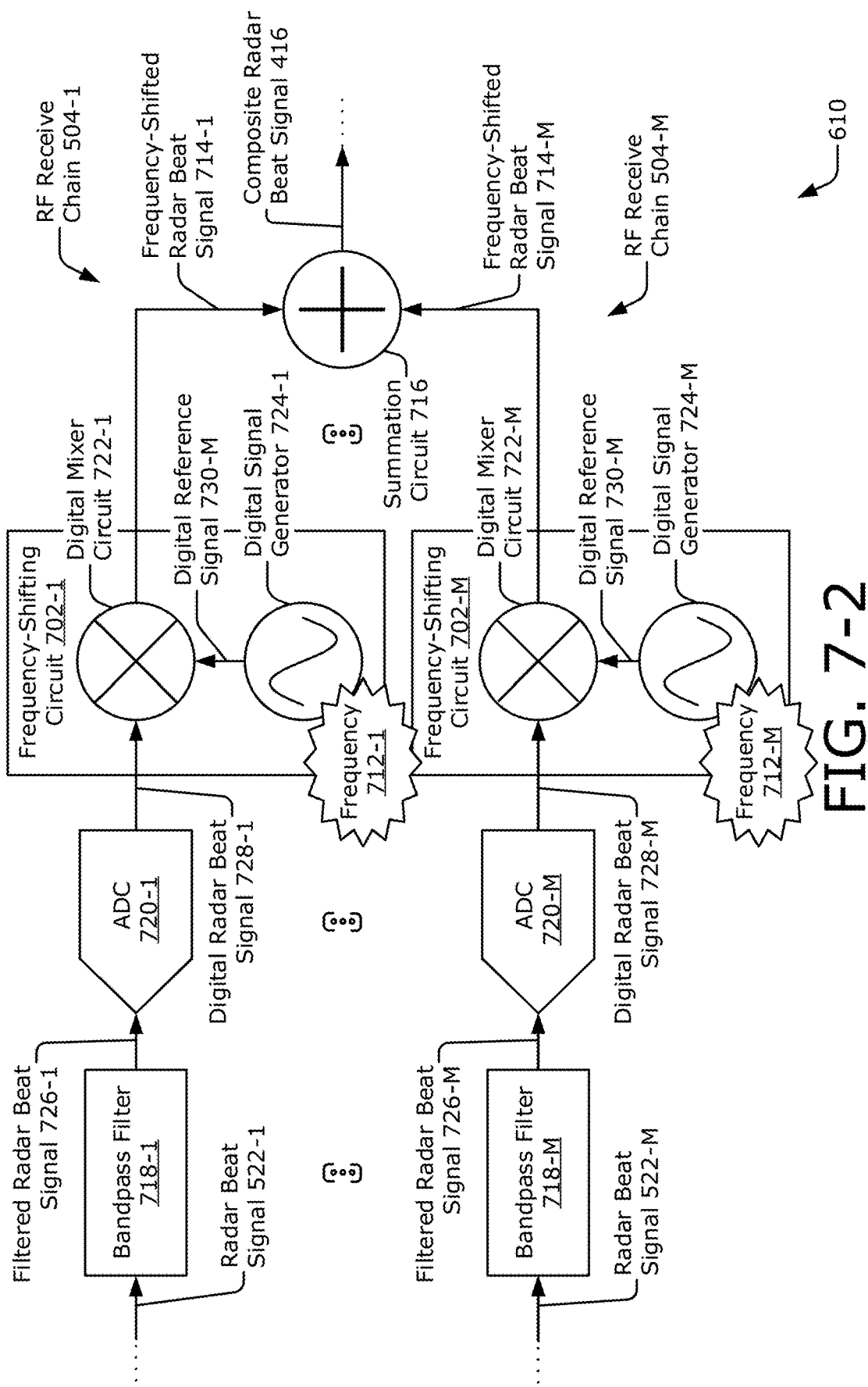

FIG. 7-1 illustrates an example analog frequency-division multiplexing circuit 608 for multiplexing radar beat signals. In the depicted configuration, the analog frequency-division multiplexing circuit 608 includes at least one frequency-shifting circuit 702 and at least one combiner circuit 704. In this case, the analog frequency-division multiplexing circuit 608 includes frequency-shifting circuits 702-1 to 702-M, which are respectively disposed in the radio-frequency receive chains 504-1 to 504-M, and respectively include analog mixers 706-1 to 706-M and frequency synthesizers 708-1 to 708-M. Inputs of the analog mixers 706-1 to 706-M are respectively coupled to outputs of the downconversion mixers 520-1 to 520-M (of FIG. 5-1). Other inputs of the analog mixers 706-1 to 706-M are respectively coupled to the frequency synthesizers 708-1 to 708-M. The frequency-shifting circuits 702-1 to 702-M respectively shift frequencies of the radar beat signals 522-1 to 522-M. As an example, the frequency shift can be between approximately 1.5 and 2 MHz between each radar beat signal 522-1 to 522-M.

The combiner circuit 704 is coupled to outputs of the analog mixers 706-1 to 706-M and to the interface circuitry 128. The combiner circuit 704 can be implemented as a Wilkinson combiner, a transformer, a directional coupler, and so forth. Generally speaking, the combiner circuit 704 combines the radar beat signals 522-1 to 522-M together to generate the composite radar beat signal 416.

During operation, the frequency synthesizers 708-1 to 708-M generate analog reference signals 710-1 to 710-M having different frequencies 712-1 to 712-M. Frequency differences between the analog reference signals 710-1 to 710-M cause the respective radar beat signals 522-1 to 522-M to be shifted in frequency by various amounts so that the beat signals are distinct in frequency (e.g., do not overlap in frequency). As an example, the frequencies 712-1 to 712-M can differ by approximately 1.5 to 2 MHz. Generally the frequency synthesizers 708-1 to 708-M generate the analog reference signals 710-1 to 710-M based on a reference clock signal or a local oscillation signal, such as the local oscillation signal 516. Alternatively, the frequency synthesizers 708-1 to 708-M can be implemented as local oscillators.

The analog mixers 706-1 to 706-M respectively mix the radar beat signals 522-1 to 522-M with the analog reference signals 710-1 to 710-M to generate frequency-shifted radar beat signals 714-1 to 714-M. The combiner circuit 704 combines the frequency-shifted radar beat signals 714-1 to 714-M together to generate the composite radar beat signal 416. In this example, the composite radar beat signal 416 is an analog signal.

In an alternative implementation, the analog frequency-division multiplexing circuit 608 does not include or disables or bypasses one of the frequency-shifting circuits 702-1 to 702-M. Considering if the frequency-shifting circuit 702-1 is not included, the radar beat signal 522-1 is passed directly to the coupler circuit 704. Accordingly, the coupler circuit 704 combines the radar beat signal 522-1 with the frequency-shifted radar beat signals 714-2 to 714-M. To separate the radar beat signal 522-1 from the frequency-shifted radar beat signals 714-2 to 714-M in the frequency domain, the frequencies 712-2 to 712-M of the analog reference signals 710-2 to 710-M are determined to cause the frequency-shifted radar beat signals 714-2 to 714-M to be shifted by different amounts relative the radar beat signal 522-1.

Although the analog frequency-division multiplexing circuit 608 can conserve space within the radio-frequency integrated circuit 124 relative to some of the other types of multiplexing circuits 130 described in FIG. 6, the frequency synthesizers 708-1 can increase cost of the radio-frequency integrated circuit 124 in some embodiments. Additionally, a proximity of the frequency synthesizers 708-1 to 708-M to other signal generation components within the radio-frequency integrate circuit 124 can increase interference and reduce a dynamic range of the wireless transceiver 120 in certain embodiments. Alternatively, the multiplexing circuit 130 can be implemented as a digital frequency-division multiplexing circuit 610, which uses digital signal generators to shift frequencies of the radar beat signals 522-1 to 522-M. In some implementations, the digital signal generators may be easier and less costly to implement relative to the frequency synthesizers 708-1 to 708-M.

As indicated above, while the demultiplexing circuit 132 is not explicitly illustrated it can be implemented using analogous circuits that perform a reciprocal operation relative to the multiplexing circuit 130. For example, for the example analog frequency-division multiplexing circuit 608 of FIG. 7-1, the demultiplexing circuit 132 includes filters and mixers (or multipliers), which can be implemented using analog or digital components. The filters extract the frequency-shifted radar beat signals 714-1 to 714-M from the composite radar beat signal 416 and the mixers (or multipliers) shift the frequency of the frequency-shifted radar beat signals 714-1 to 714-M to recover the radar beat signals 522-1 to 522-M (or some version thereof such as a digital version).

FIG. 7-2 illustrates an example digital frequency-division multiplexing circuit 610 for multiplexing radar beat signals. In the depicted configuration, the digital frequency-division multiplexing circuit 610 includes at least one frequency-shifting circuit 702 and at least one summation circuit 716. In this example, the digital frequency-division multiplexing circuit 610 includes frequency-shifting circuits 702-1 to 702-M, which are respectively disposed in the radio-frequency receive chains 504-1 to 504-M. The summation circuit 716 is coupled to the frequency-shifting circuits 702-1 to 702-M and the interface circuitry 128. The digital frequency-division multiplexing circuit 610 also includes bandpass filters 718-1 to 718-M and analog-to-digital converters 720-1 to 720-M. The bandpass filters 718-1 to 718-M, the analog-to-digital converters 720-1 to 720-M, and the frequency-shifting circuits 702-1 to 702-M are respectively disposed in the radio-frequency receive chains 504-1 to 504-M.

The bandpass filters 718-1 to 718-M are respectively coupled to the outputs of the downconversion mixers 520-1 to 520-M and filter the radar beat signals 522-1 to 522-M. In some implementations, the bandpass filters 718-1 to 718-M have bandwidths of approximately 1 GHz and provide approximately 10 decibels of attenuation (e.g., rejection). In other implementations, the bandpass filters 718-1 to 718-M are implemented as lowpass filters that have bandwidths of approximately 8 GHz. The bandpass filters 718-1 to 718-M can improve the signal-to-noise ratio of the composite radar beat signal 416 by attenuating noise within the radar beat signals 522-1 to 522-M. This can reduce the amount of noise that is folded when the radar beat signals 522-1 to 522-M are combined by the summation circuit 716.

The analog-to-digital converters 720-1 to 720-M are respectively coupled to the bandpass filters 718-1 to 718-M. In some implementations, the analog-to-digital converters 720-1 to 720-M respectively sample the radar beat signals 522-1 to 522-M at a sampling rate that is less than a Nyquist rate of the radar beat signals 522-1 to 522-M. In other words, the sampling rate of the analog-to-digital converters 720-1 to 720-M comprises a sub-Nyquist sampling rate, which can be a factor of 32 or 64 lower than the Nyquist sampling rate, for instance. Using the sub-Nyquist sampling rate, the analog-to-digital converters 720-1 to 720-M can reduce the sampling rate and therefore reduce the bandwidth requirement of the interface circuity 128 that couples the radio-frequency integrated circuit 124 to the processor 126.

The frequency-shifting circuits 702-1 to 702-M include digital mixer circuits 722-1 to 722-M and digital signal generators 724-1 to 724-M. In some implementations, the digital signal generators 724-1 to 724-M are implemented as numerically-controlled oscillators. Inputs of the digital mixer circuits 722-1 to 722-M are respectively coupled to the analog-to-digital converters 720-1 to 720-M. Other inputs of the digital mixer circuits 722-1 to 722-M are respectively coupled to the digital signal generators 724-1 to 724-M. The frequency-shifting circuits 702-1 to 702-M respectively shift frequencies of the radar beat signals 522-1 to 522-M. As an example, the frequency shift can be between approximately 1.5 and 2 MHz between each radar beat signal 522-1 to 522-M.

The summation circuit 716 is coupled to outputs of the digital mixer circuits 722-1 to 722-M and to the interface circuitry 128. Generally speaking, the summation circuit 716 combines the radar beat signals 522-1 to 522-M together to generate the composite radar beat signal 416.

During operation, the bandpass filters 718-1 to 718-M filter the radar beat signals 522-1 to 522-M to generate filtered radar beat signals 726-1 to 726-M. The analog-to-digital converters 720-1 to 720-M digitize the filtered radar beat signals 726-1 to 726-M to generate digital radar beat signals 728-1 to 728-M, which are provided to the digital mixer circuits 722-1 to 722-M.

Within the frequency-shifting circuits 702-1 to 702-M, the digital signal generators 724-1 to 724-M generate digital reference signals 730-1 to 730-M having different frequencies 712-1 to 712-M. The digital mixer circuits 722-1 to 722-M mix the digital radar beat signals 728-1 to 728-M with the digital reference signals 730-1 to 730-M to generate the frequency-shifted radar beat signals 714-1 to 714-M. The summation circuit 716 combines the frequency-shifted radar beat signals 714-1 to 714-M together to generate the composite radar beat signal 416. In this example, the composite radar beat signal 416 is a digital signal.

In an alternative implementation, the digital frequency-division multiplexing circuit 610 does not include or disables or bypasses the frequency-shifting circuit 702-1. In this case, the digital radar beat signal 728-1 is passed directly to the summation circuit 716. Accordingly, the summation circuit 716 combines the digital radar beat signal 728-1 with the frequency-shifted radar beat signals 714-2 to 714-M. To separate the digital radar beat signal 728-1 from the frequency-shifted radar beat signals 714-2 to 714-M in the frequency domain, the frequencies 712-2 to 712-M of the digital reference signals 730-2 to 730-M are determined to cause the frequency-shifted radar beat signals 714-2 to 714-M to be shifted by different amounts relative the digital radar beat signal 728-1.

As indicated above, while the demultiplexing circuit 132 is not explicitly illustrated it can be implemented using analogous circuits that perform a reciprocal operation relative to the multiplexing circuit 130. For example, for the example digital frequency-division multiplexing circuit 610 of FIG. 7-2, the demultiplexing circuit 132 includes filters and multipliers, which can be implemented using digital components. The filters extract the frequency-shifted radar beat signals 714-1 to 714-M from the composite radar beat signal 416 and the multipliers shift the frequency of the frequency-shifted radar beat signals 714-1 to 714-M to recover the radar beat signals 522-1 to 522-M.

Figure 8:
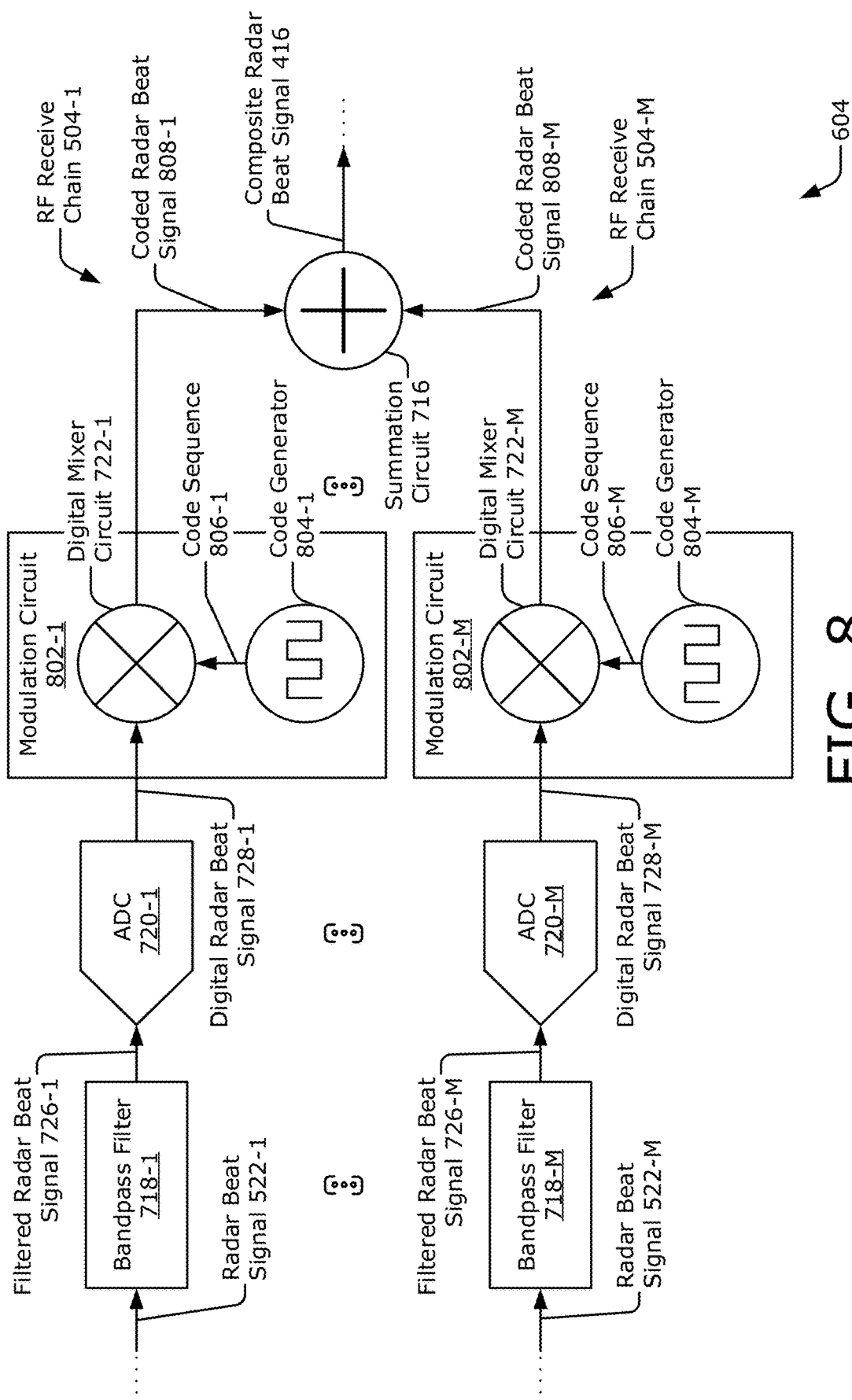
FIG. 8 illustrates an example code-division multiplexing circuit for multiplexing radar beat signals.

FIG. 8 illustrates an example code-division multiplexing circuit 604 for multiplexing radar beat signals. The code-division multiplexing circuit 604 includes the bandpass filters 718-1 to 718-M, the analog-to-digital converters 720-1 to 720-M and the summation circuit 716, which are described above with respect to FIG. 7-2. Instead of including the frequency-shifting circuits 702-1 to 702-M of FIG. 7-2, however, the code-division multiplexing circuit 604 includes modulation circuits 802-1 to 802-M, which are respectively disposed in the radio-frequency receive chains 504-1 to 504-M. The modulation circuits 802-1 to 802-M respectively include code generators 804-1 to 804-M and the digital mixer circuits 722-1 to 722-M. Generally speaking, the modulation circuits 802-1 to 802-M modulate phases of the radar beat signals 522-1 to 522-M.

During operation, the code generators 804-1 to 804-M generate code sequences 806-1 to 806-M, which are orthogonal to each other. As an example, the code sequences 806-1 to 806-M can be Walsh code sequences. The digital mixer circuits 722-1 to 722-M generate coded radar beat signals 808-1 to 808-M by modulating the digital radar beat signals 728-1 to 728-M based on the code sequences 806-1 to 806-M. The summation circuit 716 combines the coded radar beat signals 808-1 to 808-M together to generate the composite radar beat signal 416. In this example, the composite radar beat signal 416 is a digital signal.

As indicated above, while the demultiplexing circuit 132 is not explicitly illustrated it can be implemented using analogous circuits that perform a reciprocal operation relative to the multiplexing circuit 130. For example, for the example code-division multiplexing circuit 604 of FIG. 8, the demultiplexing circuit 132 includes other digital mixer circuits that demodulate the composite radar beat signal 416 using the code sequences 806-1 to 806-M to recover the digital radar beat signals 728-1 to 728-M.

Figures 1, 9:
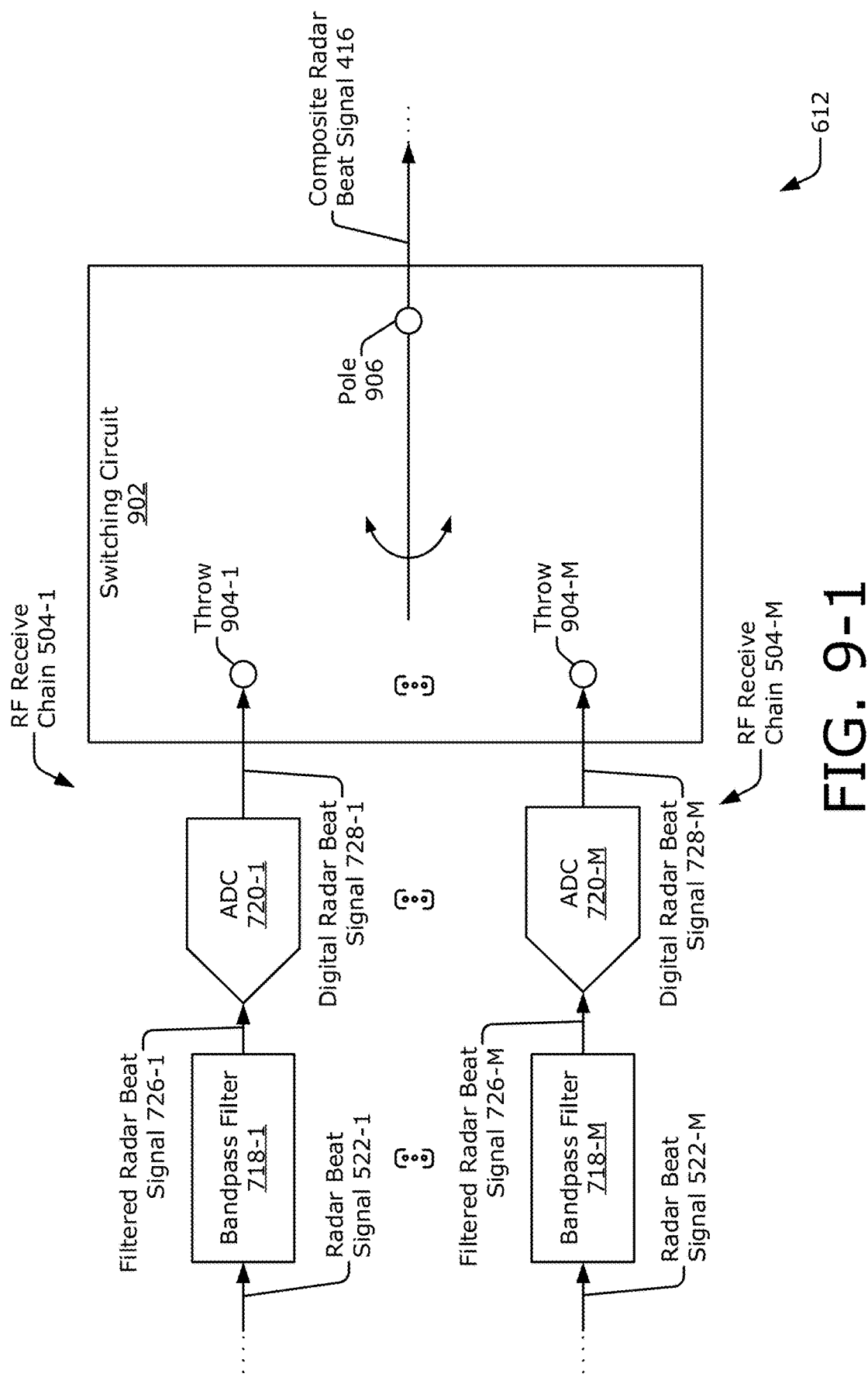
Figures 2, 9:
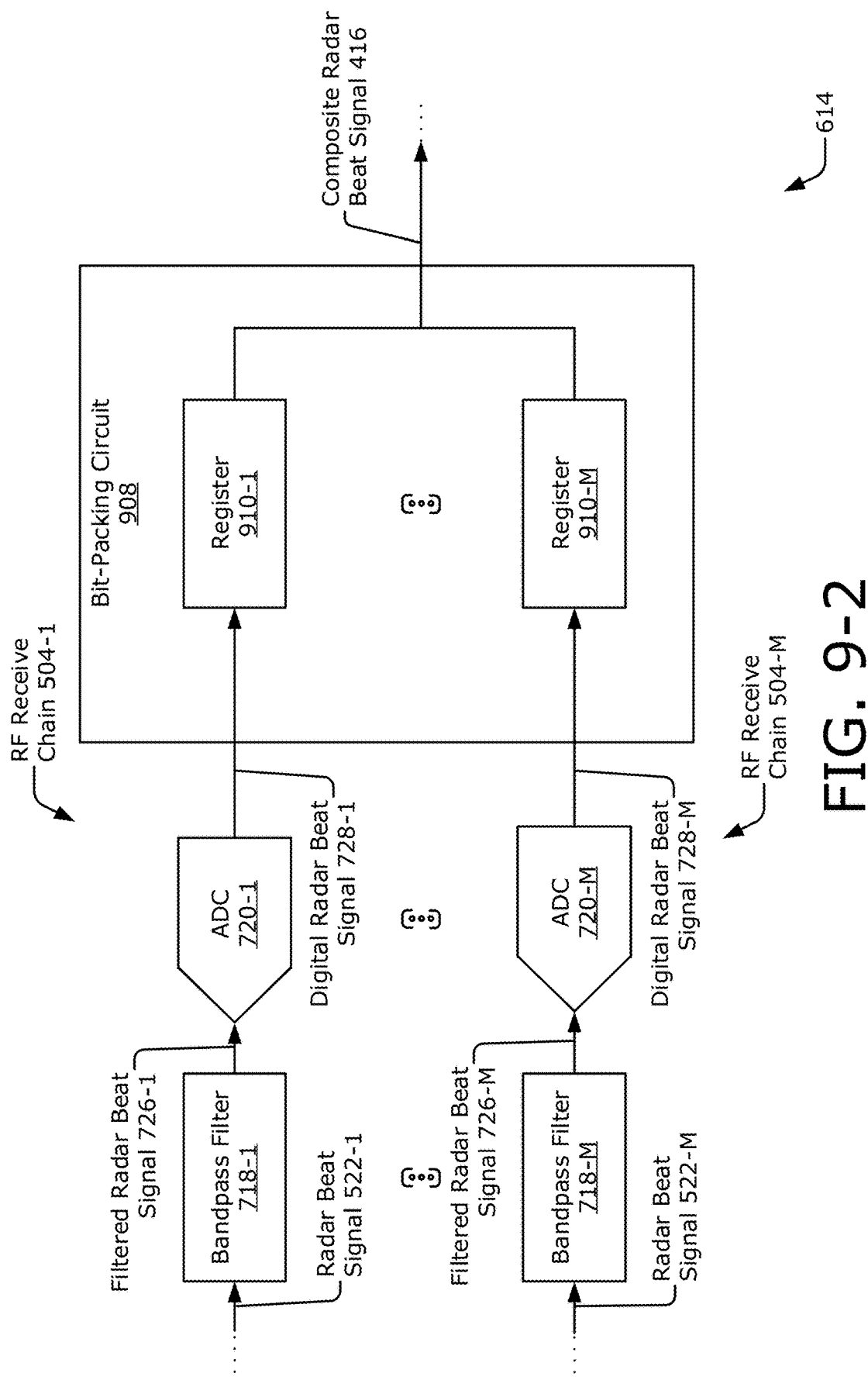

FIG. 9-1 illustrates an example digital time-division multiplexing circuit 612 for multiplexing radar beat signals. The digital time-division multiplexing circuit 612 includes the bandpass filters 718-1 to 718-M and the analog-to-digital converters 720-1 to 720-M, which are described above with respect to FIG. 7-2. Instead of including the frequency-shifting circuits 702-1 to 702-M of FIG. 7-2, however, the digital time-division multiplexing circuit 612 includes a switching circuit 902 coupled to the analog-to-digital converters 720-1 to 720-M and coupled to the interface circuitry 128.

In the depicted configuration, the switching circuit 902 is implemented as a single-pole multi-throw switch with throws 904-1 to 904-M respectively coupled to the analog-to-digital converters 720-1 to 720-M and a pole 906 coupled to the interface circuitry 128. Alternatively, the switching circuit 902 can be implemented as a multiplexer.

During operation, the switching circuit 902 selectively connects the analog-to-digital converters 720-1 to 720-M to the interface circuitry 128. As such, the switching circuit 902 interleaves different time segments of the digital radar beat signals 728-1 to 728-M together to generate the composite radar beat signal 416. As an example, the composite radar beat signal 416 includes a first set of bits of the digital radar beat signal 728-1 that are associated with a first time interval, a second set of bits of the digital radar beat signal 728-M that are associated with a second time interval, a third set of bits of the digital radar beat signal 728-1 that are associated with a third time interval, and so forth. In this example, the composite radar beat signal 416 is a digital signal.

Due to the operation of the switching circuit 902, some bits of the digital radar beat signals 728-1 to 728-M are not included within the composite radar beat signal 416. To avoid this, the multiplexing circuit 130 can alternatively be implemented by the digital packing circuit 614 such that the composite radar beat signal 416 includes all of the bits associated with the digital radar beat signals 728-1 to 728-M.

As indicated above, while the demultiplexing circuit 132 is not explicitly illustrated it can be implemented using analogous circuits that perform a reciprocal operation relative to the multiplexing circuit 130. For example, for the example digital time-division multiplexing circuit 612 of FIG. 9-1, the demultiplexing circuit 132 includes another switching circuit that demodulates the composite radar beat signal 416 to recover the digital radar beat signals 728-1 to 728-M.

FIG. 9-2 illustrates an example digital packing circuit 614 for multiplexing radar beat signals. The digital packing circuit 614 includes the bandpass filters 718-1 to 718-M and the analog-to-digital converters 720-1 to 720-M, which are described above with respect to FIG. 7-2. Instead of including the frequency-shifting circuits 702-1 to 702-M of FIG. 7-2, however, the digital packing circuit 614 includes a bit-packing circuit 908 coupled to the analog-to-digital converters 720-1 to 720-M and coupled to the interface circuitry 128. The bit-packing circuit 908 includes registers 910-1 to 910-M.

During operation, the bit-packing circuit 908 performs a series to parallel operation. In particular, the bit-packing circuit 908 stores sets of bits of the digital radar beat signals 728-1 to 728-M in the registers 910-1 to 910-M. Although these sets of bits are from different digital radar beat signals 728-1 to 728-M, the sets of bits are associated with a same time interval. Once the registers 910-1 to 910-M are full, the bit-packing circuit 908 concatenates the sets of bits within the registers 910-1 to 910-M together and passes the concatenated sets of bits to the interface circuitry 128. The process continues for following sets of bits that are associated with a following time interval. Accordingly, the composite radar beat signal 416 comprises a series of concatenated sets of bits that are associated with the digital radar beat signals 728-1 to 728-M and are grouped together based on a given time interval.

As indicated above, while the demultiplexing circuit 132 is not explicitly illustrated it can be implemented using analogous circuits that perform a reciprocal operation relative to the multiplexing circuit 130. For example, for the example digital packing circuit 614 of FIG. 9-2, the demultiplexing circuit 132 unpacks the composite radar beat signal 416 to recover the digital radar beat signals 728-1 to 728-M.

Figure 10:
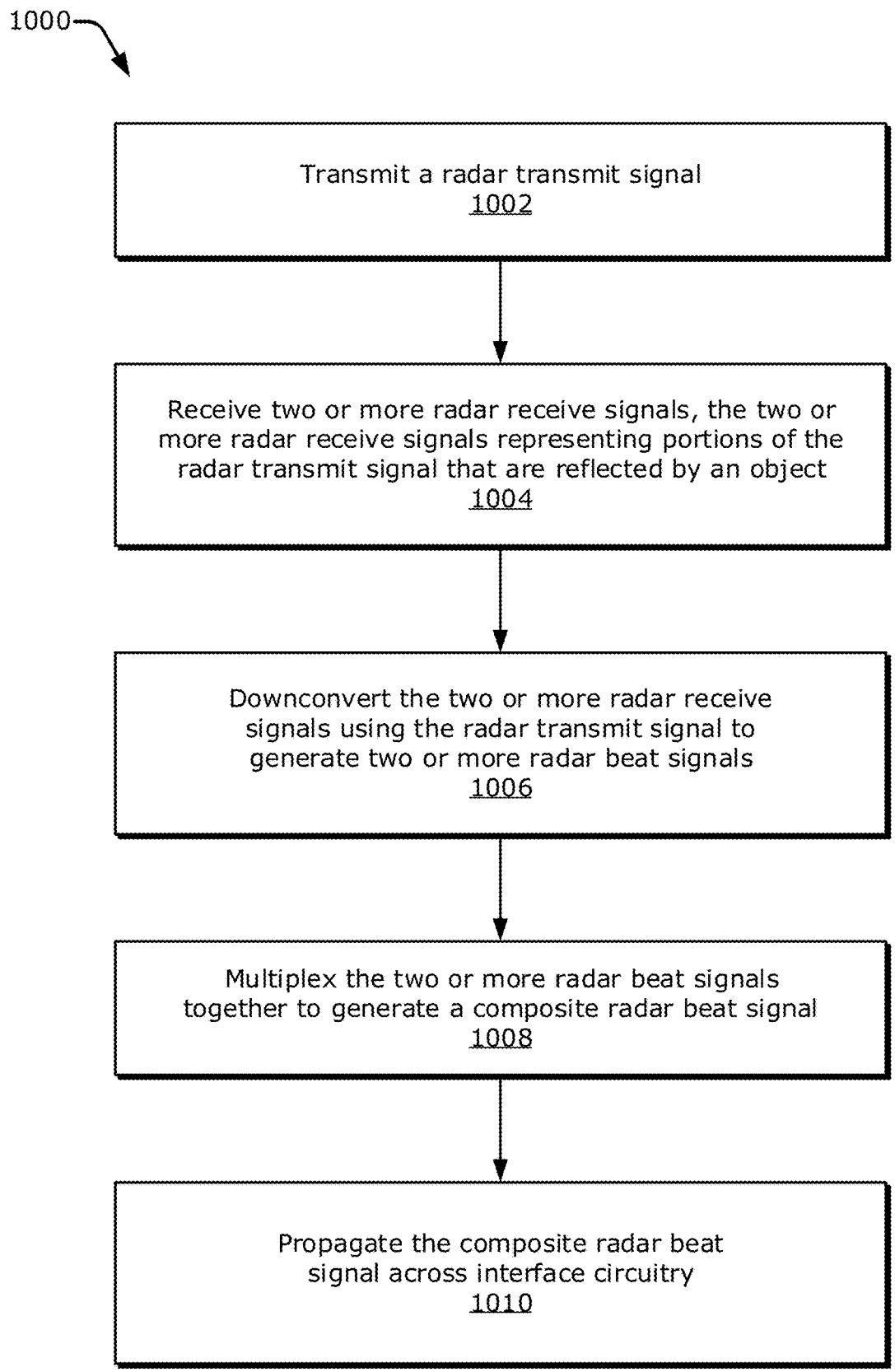
FIG. 10 is a flow diagram illustrating an example process for multiplexing radar beat signals.

FIG. 10 is a flow diagram illustrating an example process 1000 for multiplexing radar beat signals. The process 1000 is described in the form of a set of blocks 1002-1010 that specify operations that can be performed. However, operations are not necessarily limited to the order shown in FIG. 10 or described herein, for the operations may be implemented in alternative orders or in fully or partially overlapping manners. Also, more, fewer, and/or different operations may be implemented to perform the process 1000, or an alternative process. Operations represented by the illustrated blocks of the process 1000 may be performed by a wireless transceiver 120 (e.g., of FIG. 1 or 4) or a radio-frequency integrated circuit 124 (e.g., of FIG. 1, 4, or 5-1). More specifically, the operations of the process 1000 may be performed, at least partially, by a multiplexing circuit 130 as shown in FIGS. 4, 5-1, and 7-1 to 9-2.

At block 1002, a radar transmit signal is transmitted. For example, at least one transmit antenna element 506 of the antenna array 122 and at least one radio-frequency transmit chain 502 jointly transmit the radar transmit signal 210 of FIG. 2-1. The radar transmit signal 210 can be a frequency-modulated continuous-wave (FMCW) signal or a frequency-modulated pulsed signal. The type of frequency modulation can include a linear frequency modulation, a triangular frequency modulation, a sawtooth frequency modulation, and so forth.

At block 1004, two or more radar receive signals are received. The two or more radar receive signals represent portions of the radar transmit signal that are reflected by an object. For example, two or more receive antenna elements 508-1 to 508-M of the antenna array 122 and two or more receive chains 504-1 to 504-M respectively receive two or more radar receive signals 212-1 to 212-M, as shown in FIG. 5-1. The radar receive signals 212-1 to 212-M represent portions of the radar transmit signal 210 that are reflected by the object 206, such as an appendage of a user.

The radar receive signals 212-1 to 212-M and the radar transmit signal 210 are associated with a same frequency band. The frequency band can be, for instance, a sub-6 GHz frequency band or a frequency band associated with millimeter wavelengths. The frequency band can also be associated with a particular radar frequency band, such as L-band, S-band, C-band, X-band, Ka-band, and so forth. L-band includes frequencies between 1 and 2 GHz, S-band includes frequencies between 2 and 4 GHz, C-band includes frequencies between 4 and 8 GHz, X-band includes frequencies between 8 and 12 GHz, and Ka-band includes frequencies between 27 and 40 GHz.

At block 1006, the two or more radar receive signals are downconverted to generate two or more radar beat signals using the radar transmit signal. For example, the downconversion mixers 520-1 to 520-M respectively generate the radar beat signals 522-1 to 522-M by downconverting the radar receive signals 212-1 to 212-M using the radar transmit signal 210. Because the downconversion operation uses the radar transmit signal 210, the downconversion operation is a beating operation, which demodulates the radar receive signals 212-1 to 212-M. Due to the beating operation, the frequencies of the radar beat signals 522-1 to 522-M are proportional to a distance between the antenna array 122 and at least a portion of the object 206 that reflects the radar transmit signal 210. Furthermore, bandwidths of the radar beat signals 522-1 to 522-M are narrower than bandwidths of the corresponding radar receive signals 212-1 to 212-M.

At block 1008, the two or more radar beat signals are multiplexed together to generate a composite radar beat signal. For example, the multiplexing circuit 130 multiplexes the radar beat signals 522-1 to 522-M together to generate the composite radar beat signal 416, as shown in FIG. 5-1. Depending on an implementation of the multiplexing circuit 130, the composite radar beat signal 416 can be an analog signal or a digital signal. The multiplexing circuit 130 can be implemented as a frequency-division multiplexing (FDM) circuit 602 (as shown in FIGS. 7-1 and 7-2), a code-division multiplexing (CDM) circuit 604 (as shown in FIG. 8), a time-division multiplexing (TDM) circuit 606 (as shown in FIGS. 9-1 and 9-2), and so forth.

At block 1010, the composite radar beat signal is propagated across interface circuitry. For example, the interface circuitry 128 propagates the composite radar beat signal 416 from the radio-frequency integrated circuit 124 to the processor 126. In some cases, at least a portion of the interface circuitry 128 includes a resource-constrained interface. The resource-constrained interface can have a limited quantity of communication paths (e.g., electrical connectors) available during reception and/or a constrained bandwidth. As an example, the resource-constrained interface includes a smaller quantity of communication paths relative to a quantity of the two or more radar beat signals 522-1 to 522-M. As another example, the bandwidth of the resource-constrained interface is smaller than a bandwidth of any of the radar receive signals 212-1 to 212-M. By propagating the composite radar beat signal 416, the interface circuitry 128 can effectively pass the radar beat signals 522-1 to 522-M in parallel from the radio-frequency integrated circuit 124 to the processor 126, even across the resource-constrained interface.

While not illustrated, additional operations may be performed as part of the process 1000. For example, in some implementations, the demultiplexing circuit 132 demultiplexes the composite radar beat signal 416, as shown in FIG. 5-2. The digital beamformer 134 can also generate a spatial response 538 based on the demultiplexed radar beat signals 522-1 to 522-M. Furthermore, computing device 102 can detect the object 206 and determine characteristics about the object 206 using the object classification module 528 and/or the angle estimation module 530. Upon detecting the object 206, the transmission parameter adjustment module 532 can adjust a transmission parameter for a subsequent signal, such as a later-transmitted uplink signal 202.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus comprising:
    a radio-frequency integrated circuit configured to be coupled to an antenna array, the radio-frequency integrated circuit configured to:
        transmit a radar transmit signal using the antenna array; and
        receive two or more radar receive signals using the antenna array, the two or more radar receive signals representing portions of the radar transmit signal that is reflected by an object,
    the radio-frequency integrated circuit comprising:
        two or more receive chains each configured to generate a radar beat signal by downconverting a respective radar receive signal of the two or more radar receive signals using the radar transmit signal; and
        a multiplexing circuit coupled to the two or more receive chains, the multiplexing circuit configured to multiplex the radar beat signals together to generate a composite radar beat signal;
    a demultiplexing circuit; and
    interface circuitry coupled to the multiplexing circuit and configured to be coupled to a processor, the interface circuitry comprising at least one communication path, a quantity of the radar beat signals being greater than a quantity of paths in the at least one communication path, the interface circuitry configured to pass the composite radar beat signal from the multiplexing circuit to the demultiplexing circuit.

2. The apparatus of claim 1, wherein:
the radar transmit signal and the two or more radar receives signals are associated with a same frequency band.

3. The apparatus of claim 1, further comprising:
the processor,
wherein the demultiplexing circuit is implemented within the processor.

4. The apparatus of claim 1, wherein:
the demultiplexing circuit is implemented within the interface circuitry.

5. The apparatus of claim 1, wherein:
the at least one communication path comprises at least one electrical connection coupled between the multiplexing circuit and the demultiplexing circuit.

6. The apparatus of claim 1, further comprising:
the processor, wherein:
the processor comprises two or more digital receive chains, a quantity of digital receive chains in the two or more digital receive chains being equal to a quantity of receive chains in the two or more receive chains of the radio-frequency integrated circuit; and
the demultiplexing circuit is coupled between the interface circuitry and the two or more digital receive chains, the demultiplexing circuit configured to:
    demultiplex the composite radar beat signal to extract the radar beat signals; and
    provide the extracted radar beat signals respectively to the two or more digital receive chains.

7. The apparatus of claim 6, wherein:
the processor comprises a digital beamformer coupled to the two or more digital receive chains, the digital beamformer configured to generate a spatial response that indicates an angular position of the object based on the extracted radar beat signals.

8. The apparatus of claim 1, wherein:
the multiplexing circuit comprises a frequency-division multiplexing circuit configured to perform frequency-division multiplexing to generate the composite radar beat signal.

9. The apparatus of claim 8, wherein:
the frequency-division multiplexing circuit is configured to:
shift frequencies of the radar beat signals by different amounts to generate frequency-shifted radar beat signals; and
generate the composite radar beat signal based on the frequency-shifted radar beat signals.

10. The apparatus of claim 9, wherein:
the frequency-division multiplexing circuit comprises an analog frequency-division multiplexing circuit, the analog frequency-division multiplexing circuit comprising:
two or more frequency synthesizers respectively disposed in the two or more receive chains, the two or more frequency synthesizers configured to generate respective analog reference signals having different frequencies;
two or more analog mixers respectively disposed in the two or more receive chains and respectively coupled to the two or more frequency synthesizers, the two or more analog mixers configured to generate the frequency-shifted radar beat signals respectively using the analog reference signals; and
a combiner circuit coupled to the two or more analog mixers and configured to generate the composite radar beat signal based on the frequency-shifted radar beat signals.

11. The apparatus of claim 9, wherein:
the frequency-division multiplexing circuit comprises a digital frequency-division multiplexing circuit, the digital frequency-division multiplexing circuit comprising:
two or more analog-to-digital converters respectively disposed in the two or more receive chains, each of the two or more analog-to-digital converters configured to generate a digital radar beat signal based on a respective radar beat signal;
two or more digital signal generators respectively disposed in the two or more receive chains and configured to generate respective digital reference signals having different frequencies;
two or more digital mixer circuits respectively disposed in the two or more receive chains, respectively coupled to the two or more analog-to-digital converters, and respectively coupled to the two or more digital signal generators; each of the two or more digital mixer circuits configured to generate a frequency-shifted radar beat signal using a respective digital reference signal; and
a summation circuit coupled to the two or more digital mixer circuits and configured to generate the composite radar beat signal based on the frequency-shifted radar beat signals.

12. The apparatus of claim 11, wherein:
the multiplexing circuit comprises two or more bandpass filters respectively disposed in the two or more receive chains, the two or more bandpass filters respectively coupled to the two or more analog-to-digital converters, each of the two or more bandpass filters configured to generate a filtered radar beat signal based on a respective radar beat signal; and
each of the two or more analog-to-digital converters is configured to generate a digital radar beat signal based on a respective filtered radar beat signal.

13. The apparatus of claim 1, wherein:
the multiplexing circuit comprises a code-division multiplexing circuit configured to perform code-division multiplexing to generate the composite radar beat signal.

14. The apparatus of claim 13, wherein:
the code-division multiplexing circuit comprises:
two or more analog-to-digital converters respectively disposed in the two or more receive chains, each of the two or more analog-to-digital converters configured to generate a digital radar beat signal based on a respective radar beat signal;
two or more code generators respectively disposed in the two or more receive chains and configured to generate respective orthogonal code sequences;
two or more digital mixer circuits respectively disposed in the two or more receive chains, respectively coupled to the two or more analog-to-digital converters, and respectively coupled to the two or more code generators; each of the two or more digital mixer circuits configured to generate a coded radar beat signal by modulating a phase of a respective digital radar beat signal based on a respective orthogonal code sequence; and
a summation circuit coupled to the two or more digital mixer circuits and configured to generate the composite radar beat signal based on the coded radar beat signals.

15. The apparatus of claim 1, wherein:
the multiplexing circuit comprises a time-division multiplexing circuit configured to perform time-division multiplexing to generate the composite radar beat signal.

16. The apparatus of claim 15, wherein:
the time-division multiplexing circuit comprises a digital time-division multiplexing circuit, the digital time-division multiplexing circuit comprising:
two or more analog-to-digital converters respectively disposed in the two or more receive chains, each of the two or more analog-to-digital converters configured to generate a digital radar beat signal based on a respective radar beat signal; and
a switching circuit coupled to the two or more analog-to-digital converters and configured to interleave different time segments of the digital radar beat signals together to generate the composite radar beat signal.

17. The apparatus of claim 15, wherein:
the time-division multiplexing circuit comprises a digital packing circuit, the digital packing circuit comprising:
two or more analog-to-digital converters respectively disposed in the two or more receive chains, each of the two or more analog-to-digital converters configured to generate a digital radar beat signal based on a respective radar beat signal; and
a bit-packing circuit configured to concatenate same time segments of the digital radar beat signals together to generate the composite radar beat signal.

18. The apparatus of claim 1, further comprising:
the antenna array, wherein:
the antenna array comprises a transmit antenna element and two or more receive antenna elements;
the two or more receive antenna elements are respectively coupled to the two or more receive chains;
the radio-frequency integrated circuit comprises a transmit chain coupled to the transmit antenna element; and the two or more receive antenna elements and the two or more receive chains are jointly configured to receive the two or more radar receive signals during a portion of time that the transmit chain and the transmit antenna element jointly transmit the radar transmit signal.

19. The apparatus of claim 1, further comprising:
two or more analog-to-digital converters respectively disposed in the two or more receive chains, the two or more analog-to-digital converters configured to sample the radar beat signals at a sampling rate that is less than a Nyquist rate of the radar beat signals.

20. An apparatus comprising:
transmission means for transmitting a radar transmit signal;
reception means for receiving two or more radar receive signals, the two or more radar receive signals representing portions of the radar transmit signal that are reflected by an object;
downconversion means for generating two or more radar beat signals by downconverting the two or more radar receive signals using the radar transmit signal;
multiplexing means for generating a composite radar beat signal by multiplexing the two or more radar beat signals together;
demultiplexing means for extracting the two or more radar beat signals from the composite radar beat signal; and
interface means for propagating the composite radar beat signal from the multiplexing means to the demultiplexing means, the interface means coupled to the multiplexing means and configured to be coupled to a processor, the interface means comprising at least one communication path, a quantity of the radar beat signals being greater than a quantity of paths in the at least one communication path.

21. The apparatus of claim 20, further comprising:
digital beamforming means for generating a spatial response that indicates an angular position of the object based on the two or more radar beat signals extracted by the demultiplexing means.

22. The apparatus of claim 20, wherein the multiplexing means comprises at least one of the following:
analog frequency-division multiplexing means for performing frequency-division multiplexing in an analog domain to generate the composite radar beat signal;
digital frequency-division multiplexing means for performing frequency-division multiplexing in a digital domain to generate the composite radar beat signal;
code-division multiplexing means for performing code-division multiplexing in the digital domain to generate the composite radar beat signal;
digital time-division multiplexing means for performing time-division multiplexing in the digital domain to generate the composite radar beat signal; or
digital packing means for performing bit packing in the digital domain to generate the composite radar beat signal.

23. The apparatus of claim 22, wherein:
the multiplexing means comprises the code-division multiplexing means; and
the code-division multiplexing means comprises:
analog-to-digital conversion means for generating two or more digital radar beat signals based on the two or more radar beat signals, respectively;
means for generating two or more orthogonal code sequences;
mixing means for generating two or more coded radar beat signals by modulating phases of the two or more digital radar beat signals based on the two or more orthogonal code sequences, respectively; and
means for generating the composite radar beat signal based on a summation of the two or more coded radar beat signals.

24. A method for multiplexing radar beat signals to facilitate propagation across interface circuitry, the method comprising:
transmitting a radar transmit signal;
receiving two or more radar receive signals, the two or more radar receive signals representing portions of the radar transmit signal that are reflected by an object;
downconverting the two or more radar receive signals using the radar transmit signal to generate two or more radar beat signals;
multiplexing the two or more radar beat signals together to generate a composite radar beat signal; and
propagating the composite radar beat signal across the interface circuitry to a demultiplexing circuit, the interface circuitry comprising at least one communication path, a quantity of the radar beat signals being greater than a quantity of paths in the at least one communication path.

25. The method of claim 24, wherein:
the interface circuitry comprises resource-constrained interface circuitry having a smaller bandwidth relative to a bandwidth of any of the two or more radar receive signals.

26. The method of claim 24, wherein:
the propagating of the composite radar beat signal across the interface circuitry comprises propagating the composite radar beat signal across the interface circuitry from a radio-frequency integrated circuit to a processor.

27. The method of claim 24, further comprising:
demultiplexing the composite radar beat signal using the demultiplexing circuit to extract the two or more radar beat signals;
performing digital beamforming to generate a spatial response that represents an angle to the object based on the two or more radar beat signals; and
determining the angle to the object based on the spatial response.

28. The method of claim 27, further comprising:
adjusting a transmission parameter based on the angle to produce an adjusted transmission parameter; and
transmitting an uplink signal using the adjusted transmission parameter.

29. One or more devices configured to implement at least a portion of a wireless transceiver, the one or more devices comprising:
a radio-frequency integrated circuit configured to be coupled to an antenna array, the radio-frequency integrated circuit comprising:
a transmit chain comprising an upconversion mixer;
two or more receive chains, each of the two or more receive chains comprising a downconversion mixer having an input coupled to an output of the upconversion mixer; and
a multiplexing circuit coupled to outputs of the two or more downconversion mixers; and
a demultiplexing circuit,
wherein the multiplexing circuit and the demultiplexing circuit are configured to be coupled together by interface circuitry comprising at least one communication path, wherein a quantity of the two or more receive chains is greater than a quantity of paths in the at least one communication path, and wherein the interface circuitry is configured to pass a composite radar beat signal from the multiplexing circuit to the demultiplexing circuit.

30. The apparatus one or more devices of claim 29, further comprising:
the antenna array, wherein the antenna array comprises:
a transmit antenna element coupled to the transmit chain; and
two or more receive antenna elements respectively coupled to the two or more receive chains, wherein:
the upconversion mixer is configured to generate a radar transmit signal;
the transmit antenna element and the transmit chain are jointly configured to transmit the radar transmit signal;
the two or more receive antenna elements and the two or more receive chains are jointly configured to receive two or more radar receive signals representing portions of the radar transmit signal that are reflected by an object;
the two or more downconversion mixers are configured to downconvert the two or more radar receive signals using the radar transmit signal to generate two or more radar beat signals; and
the multiplexing circuit is configured to multiplex the two or more radar beat signals together to generate the composite radar beat signal.

31. The one or more devices of claim 30, wherein:
the wireless transceiver comprises a processor comprising two or more digital receive chains; and
the demultiplexing circuit has two or more outputs coupled to respective digital receive chains of the two or more digital receive chains.

32. The one or more devices of claim 29, wherein:
the multiplexing circuit comprises a time-division multiplexing circuit comprising a digital packing circuit, the digital packing circuit comprising:
two or more analog-to-digital converters respectively disposed in the two or more receive chains, each of the two or more analog-to-digital converters configured to generate a digital radar beat signal based on a respective radar beat signal; and
a bit-packing circuit configured to concatenate same time segments of the digital radar beat signals together to generate the composite radar beat signal.

33. An apparatus comprising:
a radio-frequency integrated circuit configured to be coupled to an antenna array, the radio-frequency integrated circuit configured to:
transmit a radar transmit signal using the antenna array; and
receive multiple radar receive signals using the antenna array, the multiple radar receive signals representing portions of the radar transmit signal that are reflected by an object,
the radio-frequency integrated circuit comprising:
multiple receive chains each configured to generate a radar beat signal by downconverting a respective radar receive signal of the multiple radar receive signals using the radar transmit signal; and
a multiplexing circuit coupled to the multiple receive chains, the multiplexing circuit configured to multiplex the radar beat signals together to generate a composite radar beat signal;
a demultiplexing circuit; and
interface circuitry configured to pass the composite radar beat signal from the multiplexing circuit to the demultiplexing circuit;
a processor comprising multiple digital receive chains,
wherein the demultiplexing circuit is coupled between the interface circuitry and the two or more digital receive chains, the demultiplexing circuit configured to:
demultiplex the composite radar beat signal to extract the radar beat signals; and
provide the extracted radar beat signals respectively to the multiple digital receive chains.

\* \* \* \* \*